US012206479B2

(12) United States Patent
Oteri et al.

(10) Patent No.: US 12,206,479 B2
(45) Date of Patent: Jan. 21, 2025

(54) CSI FEEDBACK IN NR-U

(71) Applicant: InterDigital Patent Holdings, Inc., Wilmington, DE (US)

(72) Inventors: Oghenekome Oteri, San Diego, CA (US); Ahmad Reza Hedayat, Aliso Viejo, CA (US); Shahrokh Nayeb Nazar, San Diego, CA (US); Rui Yang, Greenlawn, NY (US)

(73) Assignee: InterDigital Patent Holdings, Inc., Willmington, DE (US)

( * ) Notice: Subject to any disclaimer, the term of this patent is extended or adjusted under 35 U.S.C. 154(b) by 0 days.

(21) Appl. No.: 18/387,349

(22) Filed: Nov. 6, 2023

(65) Prior Publication Data

US 2024/0072866 A1    Feb. 29, 2024

Related U.S. Application Data

(63) Continuation of application No. 17/266,370, filed as application No. PCT/US2019/045670 on Aug. 8, 2019, now abandoned.

(Continued)

(51) Int. Cl.
*H04B 7/06* (2006.01)
*H04L 5/00* (2006.01)
(Continued)

(52) U.S. Cl.
CPC ......... *H04B 7/0626* (2013.01); *H04L 5/0048* (2013.01); *H04W 72/23* (2023.01); *H04W 74/0808* (2013.01); *H04W 16/14* (2013.01)

(58) Field of Classification Search
CPC ....... H04B 7/00; H04B 7/0626; H04L 5/0048; H04L 5/0094; H04L 5/0057; H04L 5/001;
(Continued)

(56) References Cited

U.S. PATENT DOCUMENTS 8,995,293 B2    3/2015  Jongren et al.
2017/0170940 A1  6/2017  Lee et al.
(Continued)

FOREIGN PATENT DOCUMENTS

CN    106170942 A    11/2016
CN    107113647 A    8/2017
(Continued)

OTHER PUBLICATIONS

3rd Generation Partnership Project (3GPP), Chairman's notes, 3GPP TSG RAN WG1 Meeting #90bis, Prague, CZ, Oct. 2017.
(Continued)

*Primary Examiner* — Mohamed A Kamara
(74) *Attorney, Agent, or Firm* — Condo Roccia Koptiw LLP

(57) ABSTRACT

Systems, methods, and instrumentalities are described herein that may be used for transmission of one or more DCI, CSI-RS and/or CSI reports. A wireless transmit/receive unit (WTRU) may receive a DCI that includes information indicating two channel state information reference signal (CSI-RS) resources and four CSI reporting resources. Each CSI-RS resource may be associated with two CSI reporting resources. The WTRU may monitor a first CSI-RS resource for a CSI-RS. If the WTRU does not identify the CSI-RS in the first CSI-RS resource, the WTRU may monitor a second CSI-RS resource for the CSI-RS. The WTRU may receive the CSI-RS on the first CSI-RS resource or the second CSI-RS resource. The WTRU may determine availabilities of the first and/or the second CSI reporting resource associated with the CSI-RS resource on which the WTRU received the CSI-RS. The WTRU may transmit a CSI report on an available CSI reporting resource.

12 Claims, 21 Drawing Sheets

Related U.S. Application Data

(60) Provisional application No. 62/716,068, filed on Aug. 8, 2018.

(51) Int. Cl.
*H04W 72/23* (2023.01)
*H04W 74/08* (2024.01)
*H04W 74/0808* (2024.01)
*H04W 16/14* (2009.01)

(58) Field of Classification Search
CPC .... H04L 5/0023; H04L 5/0035; H04W 72/23; H04W 74/0808; H04W 16/14; H04W 48/12; H04W 24/10
See application file for complete search history.

(56) References Cited

U.S. PATENT DOCUMENTS

| | | |
|---|---|---|
| 2018/0063736 A1 | 3/2018 | Sadeghi et al. |
| 2018/0175983 A1 | 6/2018 | Yum et al. |
| 2018/0175992 A1 | 6/2018 | Olsson et al. |
| 2018/0294848 A1 | 10/2018 | Park et al. |
| 2018/0331742 A1 | 11/2018 | Yum et al. |
| 2019/0045369 A1 | 2/2019 | Harada et al. |
| 2019/0174466 A1 | 6/2019 | Zhang et al. |
| 2019/0349052 A1* | 11/2019 | Yum ............... H04L 5/0048 |
| 2023/0064881 A1 | 3/2023 | Liu et al. |

FOREIGN PATENT DOCUMENTS

| | | |
|---|---|---|
| CN | 107771378 A | 3/2018 |
| CN | 108141267 A | 6/2018 |
| CN | 108352879 A | 7/2018 |
| WO | 2017/135344 A1 | 8/2017 |

OTHER PUBLICATIONS

3rd Generation Partnership Project (3GPP), RP-170828, "New SID on NR-based Access to Unlicensed Spectrum", Qualcomm, 3GPP TSG RAN Meeting #75, Dubrovnik, Croatia, Mar. 6-9, 2017, 5 pages.

3rd Generation Partnership Project (3GPP), TS 36.213 V14.4.0, "Technical Specification Group Radio Access Network, Evolved Universal Terrestrial Radio Access (E-UTRA), Physical Layer Procedures (Release 14)", Sep. 2017, 462 pages.

3rd Generation Partnership Project (3GPP), TS 38.212 V1.0.0, "Technical Specification Group Radio Access Network, NR, Multiplexing and Channel Coding (Release 15)", Sep. 2017, pp. 1-28.

Ghosh, Dr. Amitabha, "5G mmWave Revolution & New Radio", Nokia, IEEE Webinar, Sep. 20, 2017, pp. 1-49.

Ng et al., "Unified Access in Licensed and Unlicensed Bands in LTE-A Pro and 5G", APSIPA Transactions on Signal and Information Processing, vol. 6, E6, 2017, pp. 1-7.

* cited by examiner

CSI FEEDBACK IN NR-U

CROSS-REFERENCE TO RELATED APPLICATIONS

This application is a continuation of U.S. patent application Ser. No. 17/266,370, filed Feb. 5, 2021, which is the National Stage Entry under 35 U.S.C. § 371 of Patent Cooperation Treaty Application No. PCT/US2019/045670, filed Aug. 8, 2019, which claims the benefit of U.S. Provisional Application Ser. No. 62/716,068, filed Aug. 8, 2018, the contents of which are incorporated by reference herein.

BACKGROUND

Cellular based access in unlicensed spectrum may complement mobile service operators' licensed service offerings with Licensed Assisted Access (LAA) and enhanced Licensed Assisted Access (eLAA). LAA and eLAA have extended LTE operations into unlicensed bands any may use a licensed band to assist in an unlicensed transmission, e.g., the transmission of control channel information. LAA may support downlink transmission. eLAA may support uplink transmission.

NR-based access may be extended to the unlicensed spectrum (e.g., extended for 3GPP NR). Networks may use both sub6 and above6 unlicensed bands (e.g., 0 5 GHz, 37 GHz, 60 GHz), support licensed assisted access (NR-LAA) using an NR licensed carrier or an LTE licensed carrier, and/or support stand-alone access and/or co-exist with both legacy 3GPP technologies (e.g., LAA, eLAA) and other RATs (e.g., 802.11ac and 802.11ax in the sub6 band or 802.11ad and 802.11ay in the above6 band). NR unlicensed access may support certain deployment scenarios (e.g., indoor hotspot, dense urban, rural, urban macro, high speed, etc) and use cases (Enhanced Mobile Broadband (eMBB), Massive Machine Type Communications (mMTC) and Ultra Reliable and Low Latency Communications (URLLC)), which may be described for NR applications.

SUMMARY

Systems, methods, and instrumentalities are described herein that may be used for transmission of one or more DCI, CSI-RS and/or CSI reports. A wireless transmit/receive unit (WTRU) may receive a transmission (e.g., a DCI) from a network. The transmission may include information that indicates two channel state information reference signal (CSI-RS) resources (e.g., CSI-RS resources 1 and 2) and four CSI reporting resources (e.g., CSI reporting resources 1.1, 1.2, 2.1, and 2.2). Each CSI-RS resource may be associated with two CSI reporting resources. For example, CSI-RS resource 1 may be associated with CSI reporting resources 1.1 and 1.2, and CSI-RS resource 2 may be associated with CSI reporting resources 2.1 and 2.2. Each CSI reporting resource may be indicated in the transmission as an offset relative to the CSI-RS resource associated with the CSI reporting resource.

The WTRU may monitor CSI-RS resource 1 for a CSI-RS. If the WTRU does not identify the CSI-RS in CSI-RS resource 1 (e.g., because the CSI-RS was not sent due to listen before talk (LBT) failure), the WTRU may monitor CSI-RS resource 2 for the CSI-RS. The WTRU may receive the CSI-RS on CSI-RS resource 1 or CSI-RS resource 2.

The WTRU may determine an availability of the first CSI reporting resource associated with the CSI-RS resource on which the WTRU received the CSI-RS. For example, if the WTRU received the CSI-RS on CSI-RS resource 1, the WTRU may determine an availability of CSI reporting resource 1.1, or if the WTRU received the CSI-RS on the CSI-RS resource 2, the WTRU may determine an availability of CSI reporting resource 2.1. The WTRU may determine the availability of a CSI reporting resource by performing LBT.

If the first CSI reporting resource associated with the CSI-RS resource on which the WTRU received the CSI-RS is determined to be available, the WTRU may send a CSI report on the first CSI reporting resource (e.g., CSI reporting resource 1.1 or 2.1). If the first CSI reporting resource associated with the CSI-RS resource on which the WTRU received the CSI-RS is not determined to be available, the WTRU may determine an availability of the second CSI reporting resource associated with the CSI-RS resource on which the WTRU received the CSI-RS. For example, if the WTRU received the CSI-RS on CSI-RS resource 1, the WTRU may determine an availability of CSI reporting resource 1.2, or if the WTRU received the CSI-RS on the CSI-RS resource 2, the WTRU may determine an availability of CSI reporting resource 2.2. If the second CSI reporting resource associated with the CSI-RS resource on which the WTRU received the CSI-RS is determined to be available, the WTRU may send the CSI report on the second CSI reporting resource (e.g., CSI reporting resource 1.2 or 2.2).

BRIEF DESCRIPTION OF THE DRAWINGS

Furthermore, like reference numerals in the figures indicate like elements, and wherein:

FIG. 10 shows an example of an implementation for a non-target WTRU that was not assigned during a channel occupancy time (COT).

DETAILED DESCRIPTION

Figure 1A:
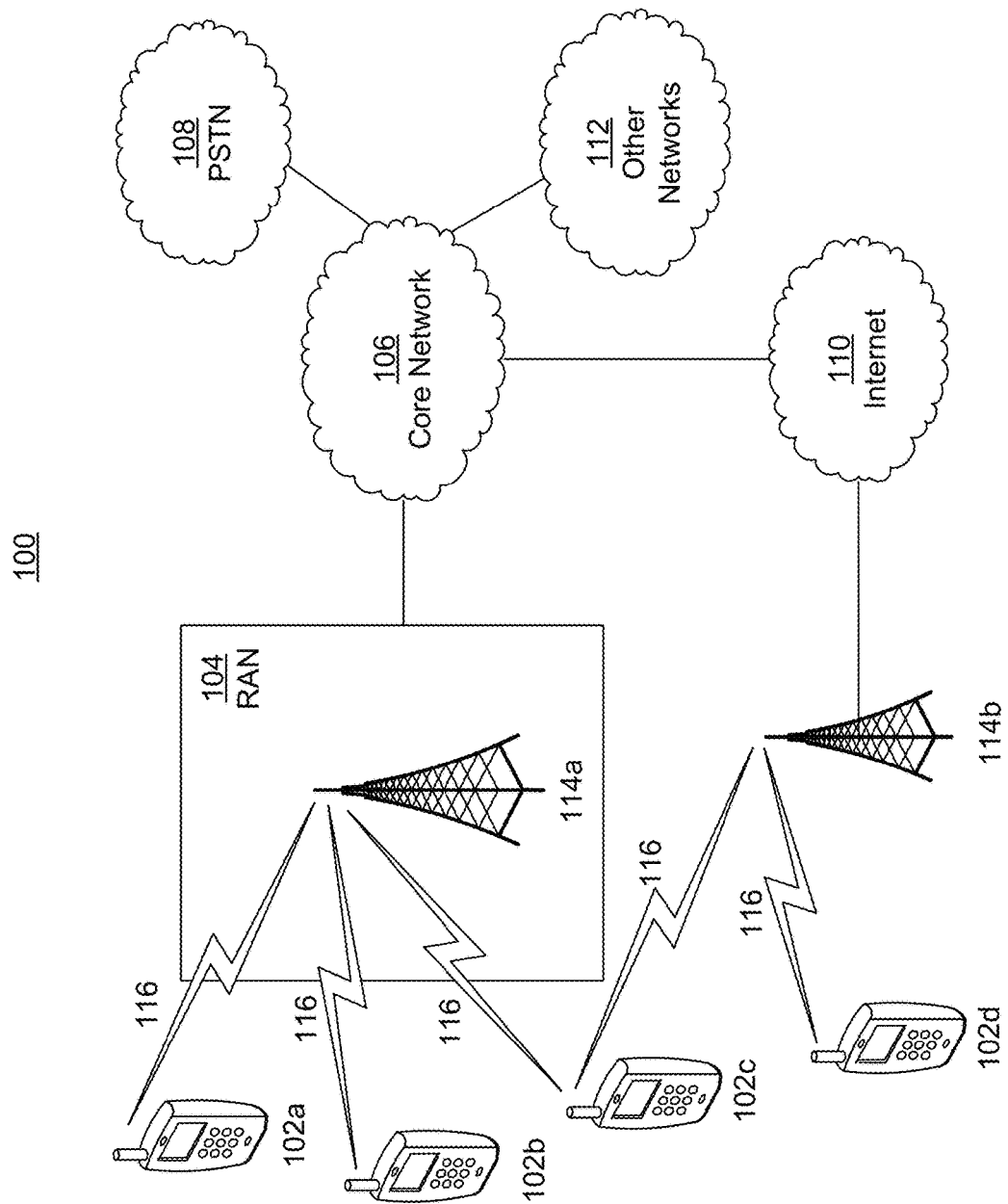
FIG. 1A is a system diagram illustrating an example communications system in which one or more disclosed examples may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using Previously Presented Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
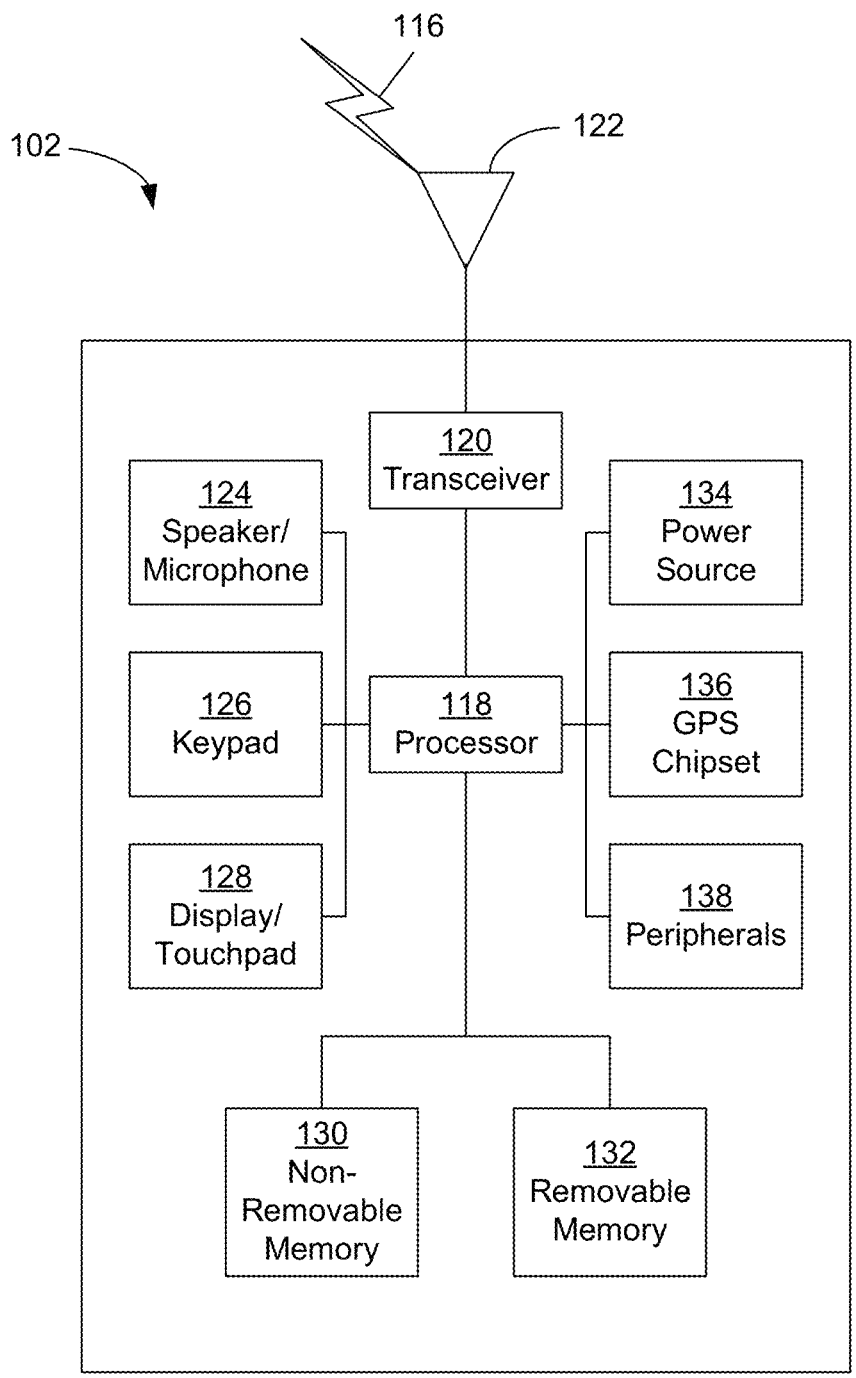
FIG. 1B is a system diagram illustrating an example wireless transmit/receive unit (WTRU) that may be used within the communications system illustrated in FIG. 1A according to an example.
Figure 1C:
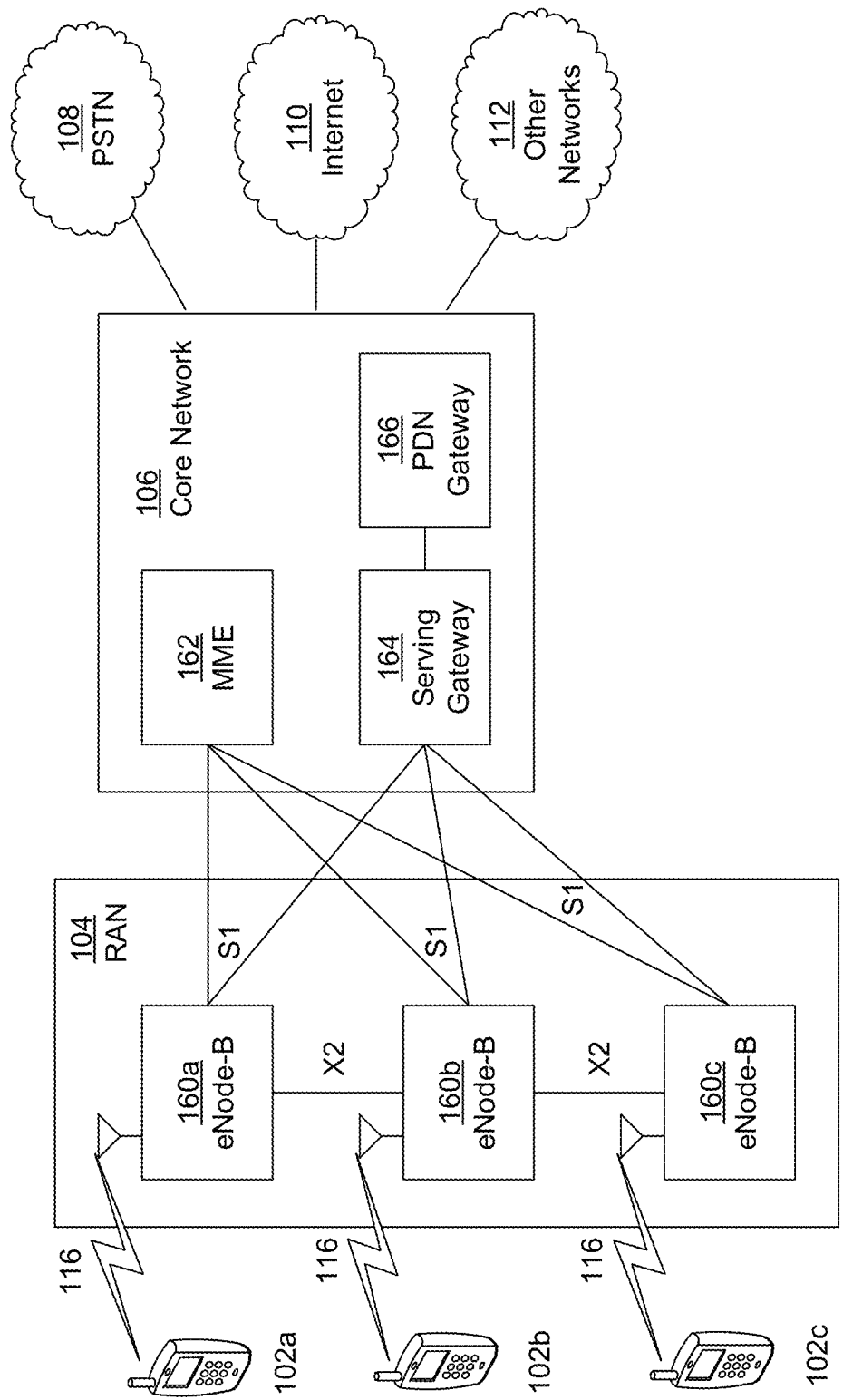
FIG. 1D is a system diagram illustrating a further example RAN and a further example CN that may be used within the communications system illustrated in FIG. 1A according to an example.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 10:
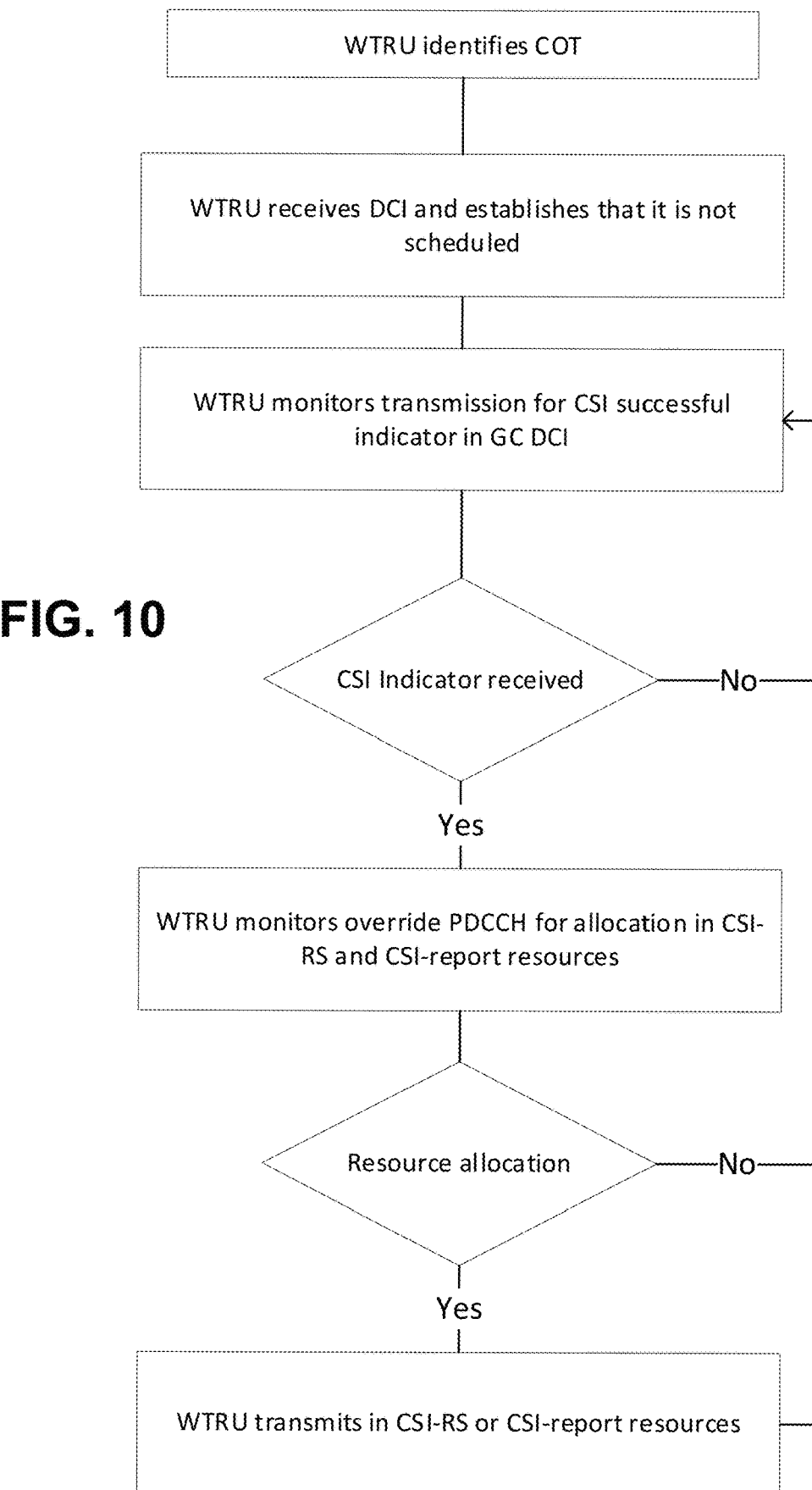
FIG. 10 is a system diagram illustrating an example radio access network (RAN) and an example core network (CN) that may be used within the communications system illustrated in FIG. 1A according to an example.

FIG. 10 is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 10, the eNode-Bs 160a, 160b, 160c may communicate with one another over an X2 interface.

The CN 106 shown in FIG. 10 may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102*a*, 102*b*, 102*c*, managing and storing contexts of the WTRUs 102*a*, 102*b*, 102*c*, and the like.

The SGW 164 may be connected to the PGW 166, which may provide the WTRUs 102*a*, 102*b*, 102*c* with access to packet-switched networks, such as the Internet 110, to facilitate communications between the WTRUs 102*a*, 102*b*, 102*c* and IP-enabled devices.

The CN 106 may facilitate communications with other networks. For example, the CN 106 may provide the WTRUs 102*a*, 102*b*, 102*c* with access to circuit-switched networks, such as the PSTN 108, to facilitate communications between the WTRUs 102*a*, 102*b*, 102*c* and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102*a*, 102*b*, 102*c* with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
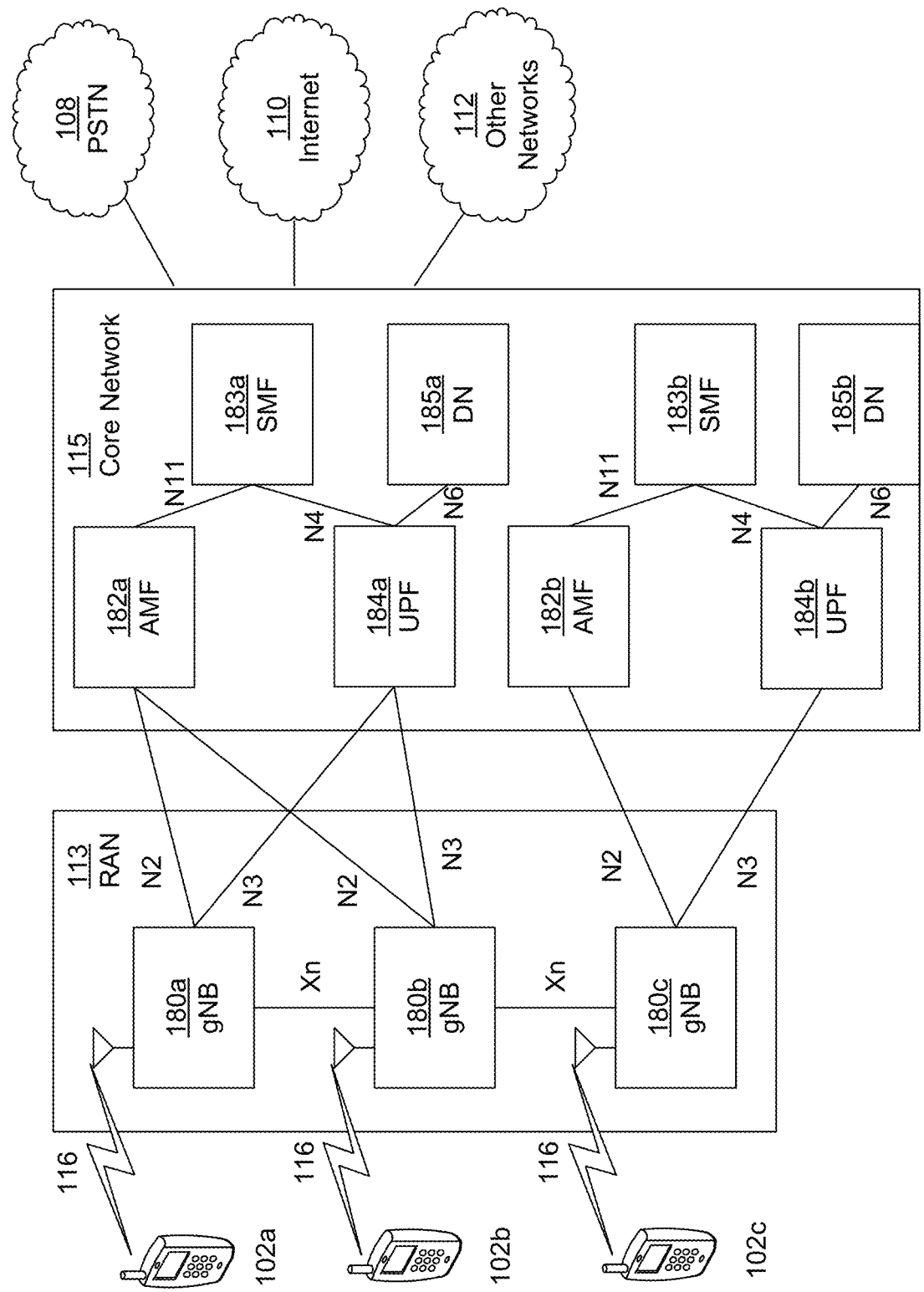

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating a WTRU IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Licensed Assisted Access (LAA) may operate in the 5 GHz unlicensed spectrum. LAA may use the Listen before talk (LBT) protocol, which may enable LAA to co-exist with other LAA deployments and other radio access technologies (RATs). LAA may include performing a Clear Channel Assessment (CCA) based on an Energy Detection (ED) over a time duration. The ED may be compared with an energy threshold to determine whether the channel is occupied or clear. A WTRU may occupy a channel (e.g., on gaining access to the channel) for a maximum duration called a Maximum Channel Occupancy Time (MCOT). Four categories of LBT may be defined.

Category 1 may be no LBT (e.g., LBT is not performed by the transmitting entity).

Category 2 may be LBT without random back-off. In category 2, the duration of time that the channel is sensed to be idle before the transmitting entity transmits may be deterministic.

Category 3 may be LBT with random back-off and a contention window of fixed size. In category 3, the transmitting entity may draw a random number N within a contention window. The size of the contention window may be specified by the minimum and maximum value of N, or may be fixed. The random number N may be used in LBT to determine the duration of time that the channel is sensed to be idle before the transmitting entity transmits on the channel.

Category 4 (e.g., Cat 4 or Cat4) may be LBT with random back-off and a contention window of variable size. In category 4, the transmitting entity may draw a random number N within a contention window. The size of the contention window may be specified by the minimum and maximum value of N. The transmitting entity may vary the size of the contention window when drawing the random number N. The random number N may be used in LBT to determine the duration of time that the channel is sensed to be idle before the transmitting entity transmits on the channel.

Different channel access priority classes and corresponding parameters may be defined in Table 1 (e.g., for random back-off). p may be a priority class index. The defer duration Td may include the duration $T_f$ 16 µs followed (e.g., immediately) by $m_p$ consecutive slot durations. In a (e.g., each) slot duration, $T_{sl}$=9 us. $CW_{min,p}$ and $CW_{max,p}$ may define the minimum and maximum size of a contention window. An eNB may not (e.g., continuously) transmit on a carrier on which the LAA Scell(s) transmission(s) are performed (e.g., for a period exceeding the MOOT ($T_{mcot,p}$).

TABLE 1

Channel Access Priority Class

| Channel Access Priority Class (p) | $m_p$ | $CW_{min,p}$ | $CW_{max,p}$ | $T_{mcot,p}$ | allowed $CW_p$ sizes |
|---|---|---|---|---|---|
| 1 | 1 | 3 | 7 | 2 ms | {3, 7} |
| 2 | 1 | 7 | 15 | 3 ms | {7, 15} |
| 3 | 3 | 15 | 63 | 8 or 10 ms | {15, 31, 63} |
| 4 | 7 | 15 | 1023 | 8 or 10 ms | {15, 31, 63, 127, 255, 511, 1023} |

LBT for frame-based and/or load-based equipment may include a minimum CCA time of 20 µs in the 5 GHz band, a maximum channel occupancy time of 10 msec, and/or an idle period of a minimum of 5% of channel occupancy time. Receive antenna gain may be G=0 dBi and an effective isotropic radiative power may be EIRP=23 dBm at the transmit, and the threshold (e.g., the energy threshold) may be ≤−73 dBm/MHz. For different transmit power levels and power headroom (PH), the threshold may be equal to −73 (dBm/MHz)+23 (dBm)−PH(dBm).

TABLE 2

LBT requirements for Frame-Based Equipment

| Parameter | Requirement | Comment |
|---|---|---|
| Clear Channel Assessment (CCA) time | Minimum 20 µs | |
| Channel Occupancy time | Minimum 1 ms, maximum10 ms | |
| Idle period | Minimum 5% of channel occupancy time | |
| Fixed frame period | Equals to Channel Occupancy time + Idle Period | |

TABLE 2-continued

LBT requirements for Frame-Based Equipment

| Parameter | Requirement | Comment |
|---|---|---|
| Short control signaling transmission time | Maximum duty cycle of 5% within an observation period of 50 ms | Part of Channel occupancy time |
| CCA Energy detection threshold | Assuming receive antenna gain G = 0 dBi: If EIRP = 23 dBm at transmitter Threshold ≤ −73 dBm/MHz Otherwise (different transmit power levels, PH) Threshold = −73(dBm/MHz) + 23(dBm) − PH(dBm) | For WAS/RLAN |

Figure 2:
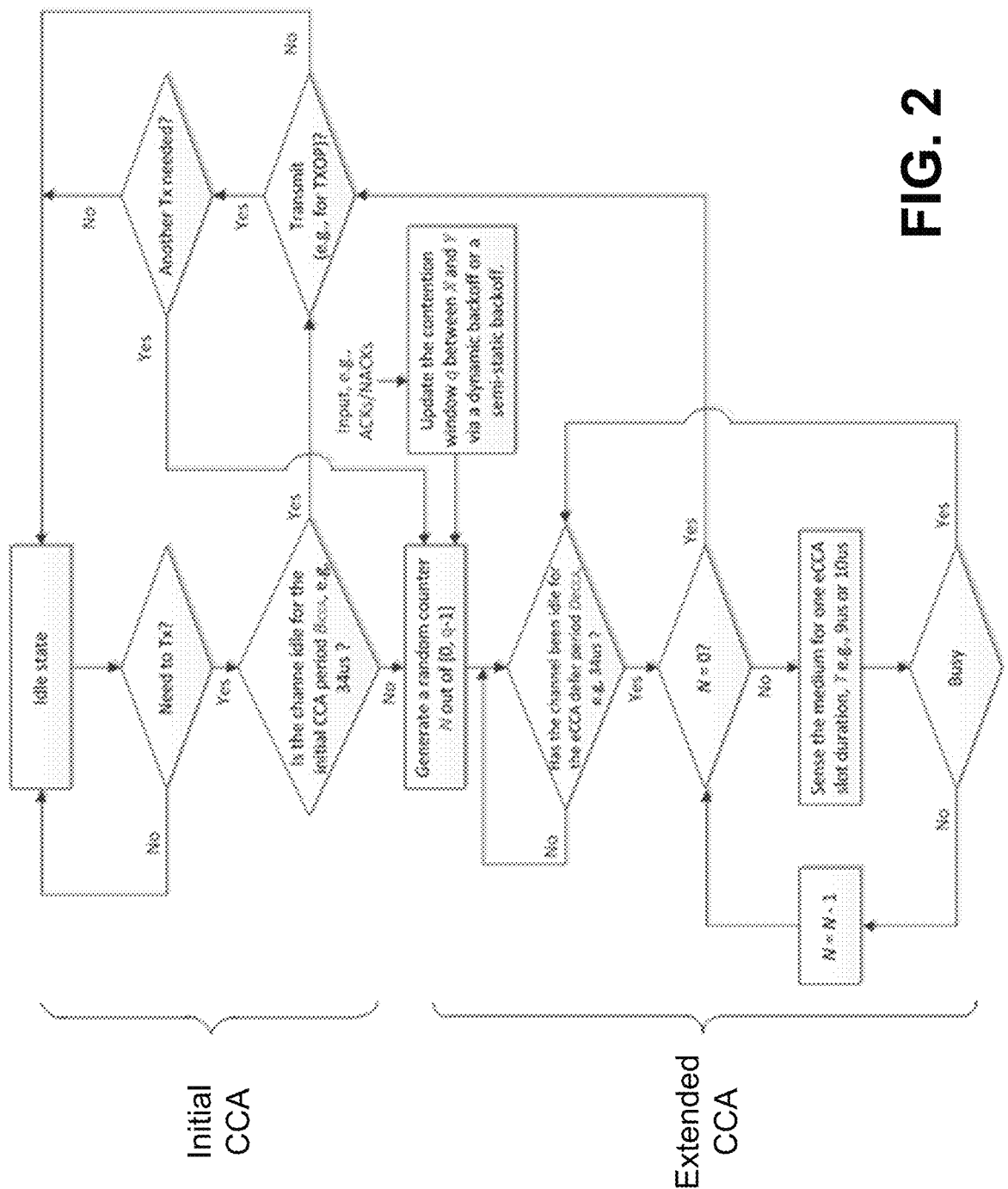
FIG. 2 shows an example of downlink (DL) Licensed Assisted Access (LAA) secondary cell (SCell) Category 4 (Cat 4) listen before talk (LBT).

An example of LBT for downlink (DL) LAA small cell (SCell) Cat 4 LBT may be shown in FIG. 2.

An extended CCA (e.g., using back-off) may be performed after an (e.g., initial) CCA that may be at least 20 us.

LAA may be used for DL. Enhanced-Licensed Assisted Access (eLAA) may be used for uplink (UL) operation for LAA. LAA and eLAA may include Further Enhanced LAA (feLAA).

LAA may include a Discovery Reference Signal (DRS). The DRS may include synchronization signals and/or reference signals for cell detection, synchronization, and/or radio resource management. The DRS may include a CSI-RS (e.g., if configured). LAA DRS may be transmitted within a periodically occurring time window (e.g., the DRS Measurement Timing Configuration (DMTC)). The time window may have a fixed duration (e.g., 6 msec), may have a configurable period (e.g., 40, 80 or 160 msec), and may be subject to LBT. The network may attempt DRS transmission in a (e.g., any) subframe within the DMTC occasion.

NR numerology on an unlicensed spectrum may include sub6 and above6 unlicensed bands (e.g., 5 GHz, 37 GHz, 60 GHz). NR-LAA may be anchored to a legacy LTE carrier by dual-connectivity (DC), and may include CA based aggregation with a 5G NR anchor.

Channel state information (CSI) feedback may be used with NR. A WTRU may use time and frequency resources to report CSI. A gNB may control the time and frequency resources (e.g., with the number of CSI-RS ports or active CSI-RS resources in a slot limited by WTRU capability). CSI may be used for time/frequency tracking, CSI computation, Layer 1 Reference Signal Received Power (L1-RSRP) computation, and/or mobility. CSI may be used for Refence Signal Received Power (RSRP) feedback or non-RSRP feedback. CSI used for non-RSRP feedback may include one or more of the following: (i) channel state information reference symbol (CSI-RS) resource indicator (CRI); (ii) rank indicator (RI); (iii) precoder matrix indicator (PMI); (iv) channel quality indicator (COI); and/or (v) layer indicator (LI).

CRI may identify the Non-Zero Power CSI-RS (NZP CSI-RS) or CSI Interference Measurement (CSI-IM) resource to be used for measurement.

RI may identify the rank of the feedback and may be dependent on the CRI.

PMI may indicate a codeword in a feedback codebook. The codebook may be standard resolution (e.g., Type I) or high resolution for MU-MIMO (e.g., Type II). Type I codebooks may used for single panel or multi-panel antennas. Type II codebooks may be used for non-precoded CSI-RSs or precoded CSI-RSs (e.g., see Table 3, which may be an example of known codebooks that may be used). The codebooks may be designed for cross-polar channels. The PMI may be dependent on the RI and/or CRI.

TABLE 3

Codebook Comparison

| Type I Single Panel Codebook | Type I Multi-Panel Codebook | Type II Non-precoded CSI-RS Codebook | Type II Precoded CSI-RS Codebook |
|---|---|---|---|
| SU-MIMO/MU-MIMO | Builds on single panel codebook (1 beam), adding inter-panel co-phasing | Forms a linear combination of 2, 3, or 4 DFT beams selected from an orthogonal basis | Selects a subset of the beamformed ports and forms a linear combination of the selected beams |
| 1-8 MIMO layers Two stage: WB beam group selection (1 and 4 beam configurations); SB beam selection and co-phasing | 1-4 MIMO layers Supports 2 or 4 antenna panels | 1-2 MIMO layers WB beam amplitudes, SB phase, and/or differential SB amplitudes | 1-2 MIMO layers WB beam amplitudes, SB phase, and/or differential SB amplitudes |
| Precoded & non-precoded CSI-RS supported | Low and high resolution SB co-phasing is available with 2 panels | | |

Channel Quality Indicator (CQI) may be wideband or subband. CQI may be defined for up to 256 QAM at targets of, for example 0.1 or 0.00001 packet error rate (PER), and may be absolute (e.g., wideband) or s differential (e.g., subband). CQI may be dependent on the PMI, RI, and/or CRI.

The CSI (e.g., used for RSRP feedback) may be one or more of the following: (i) SS/PBCH Block Resource Indicator (SSBRI), which may identify the SS/PBCH block measured; (ii) CSI-RS resource Indicator, which may identify the CSI-RS measured; and/or (iii) the L1-RSRP, which may indicate the received power for an SSBRI or CSI-RS.

A configuration identifying the resource settings, reporting settings, and trigger states may be used (e.g., for each CSI feedback). The reporting settings may be determined for a (e.g., single) downlink BWP and may include parameters such as the codebook configuration, time domain behavior, frequency granularity, measurement restriction, and/or the indicator to be sent. The resource settings may be determined to be non-zero power (NZP) CSI-RS (e.g., for interference or channel measurements), CSI-IM (e.g., for interference measurements), and/or SS/PBCH Block resources (e.g., for L1-RSRP measurements). The resource settings may be determined to be periodic, aperiodic, and/or SPS resource sets. The trigger states may link resource and/or report settings to STAs for CSI measurement and feedback.

CSI-RS resources and/or CSI-Reporting may occur in different ways and/or on different channels in NR (e.g., see Table 4 below, which may be an example of known CSI-RS Configurations and CSI Reporting that may be used). The CSI-RS resources may be periodic, SPS, and/or aperiodic. The CSI reporting may be periodic, SPS, and/or aperiodic. The reporting channel may be the control channel (e.g., PUCCH) and/or the data channel (e.g., PUCCH).

TABLE 4

CSI-RS Configuration and CSI Reporting

| CSI-RS Configuration | Periodic CSI Reporting | Semi-Persistent CSI Reporting | Aperiodic CSI Reporting |
| --- | --- | --- | --- |
| Periodic CSI-RS | No dynamic triggering/ activation | For reporting on PUCCH, the WTRU receives an activation command; for reporting on PUSCH, the WTRU receives triggering on DCI | Triggered by DCI and/or activation command |
| Semi-Persistent CSI-RS | Not supported | For reporting on PUCCH, the WTRU receives an activation command; for reporting on PUSCH, the WTRU receives triggering on DCI | Triggered by DCI and/or activation command |
| Aperiodic CSI-RS | Not supported | Not supported | Triggered by DCI and/or activation command |

Possible CSI-RS, CSI-reporting, and channel combinations may include: (i) aperiodic CSI-RS and aperiodic CSI reporting on the PUSCH; (ii) periodic/SPS CSI-RS and aperiodic CSI reporting on the PUSCH; and (iii) periodic/SPS CSI-RS and periodic/SPS CSI reporting on the PUCCH.

Figure 3:
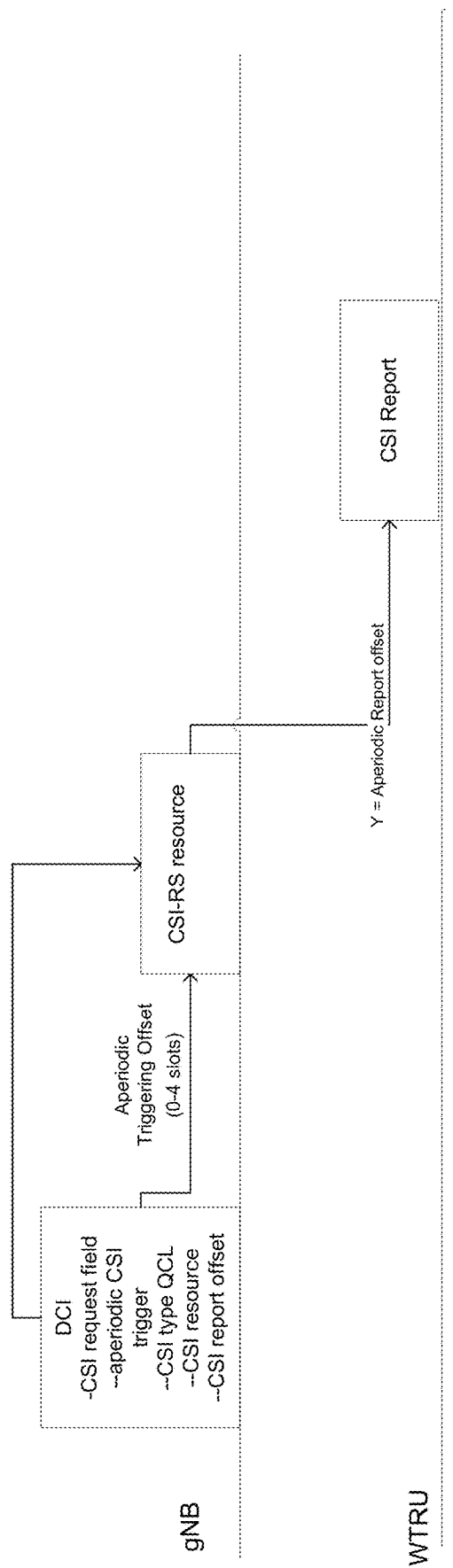
FIG. 3 shows an example of aperiodic channel state information-reference signal (CSI-RS) and aperiodic CSI reporting on the PUSCH.

FIG. 3 shows an example of aperiodic CSI-RS and aperiodic CSI reporting on the PUSCH. A gNB may send (e.g., for aperiodic CSI-RS and aperiodic CSI reporting on the PUSCH) a DCI on the PDCCH with information identifying the resource for the aperiodic CSI-RS (e.g., as an offset from the DCI) and the resource for the CSI report for transmission on the PUSCH (e.g., as an offset from the CSI-RS resource). One or more configurations may be linked to one or more CSI-RS resource settings. The configurations may include a CSI-ReportConfig (e.g., a configuration that sets up a CSI report and/or one or more CSI report parameters). For example, the CSI-RS resource may be an L1-RSRP resource (e.g., if the CSI-ReportConfig is linked to one CSI-RS resource setting). A first resource may be an NZP CSI-RS channel resource and a second may be a CSI-IM or NZP CSI-RS interference resource (e.g., if the CSI-ReportConfig is linked to two CSI-RS resource settings). The first resource may be an NZP CSI-RS channel resource, the second resource may be a CSI-IM interference resource, and a third may be an NZP CSI-RS interference resource (e.g., if the CSI-ReportConfig is linked to three CSI-RS resource settings).

The NZP CSI-RS resource for aperiodic CSI-RS may be active in a duration of time (e.g., starting from the end of the PDCCH containing the request and ending at the end of the PUSCH containing the report associated with the aperiodic CSI-RS).

Aperiodic CSI-RS and aperiodic CSI reporting on the PUSCH may support wideband and/or sub-band frequency granularities. Type I and/or Type II CSI may be transmitted with or without data multiplexing.

Figure 4:
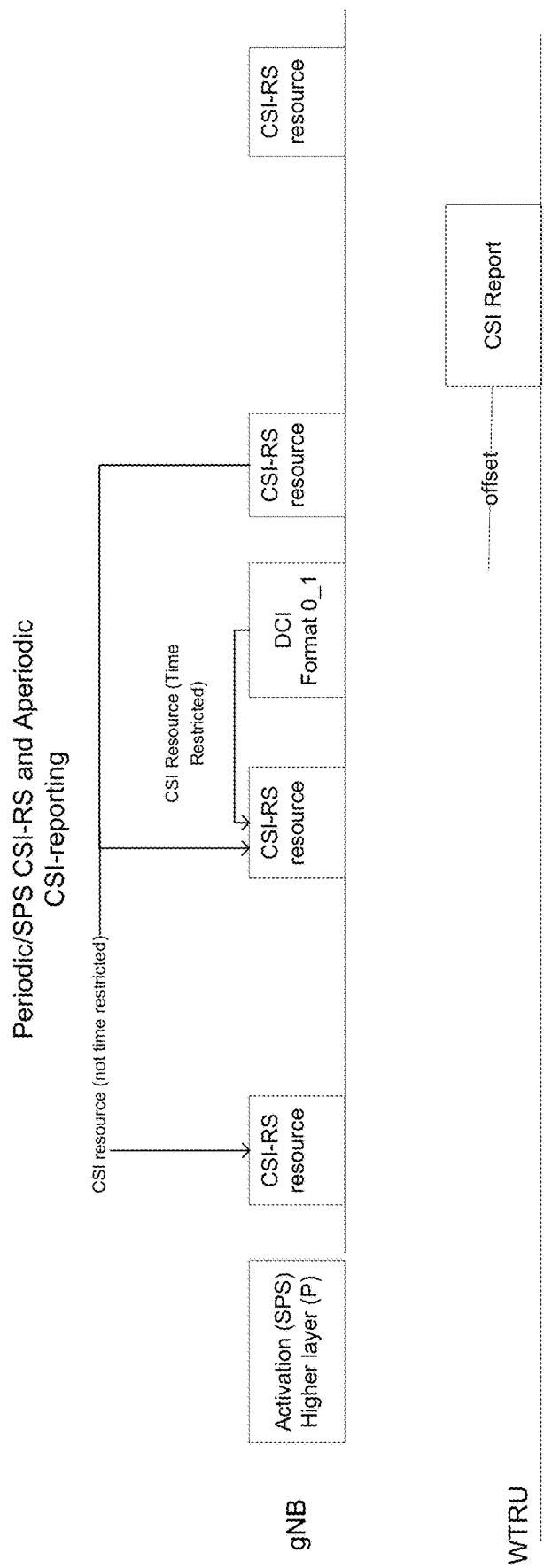
FIG. 4 shows an example of periodic/semi-persistent scheduling (SPS) CSI-RS and aperiodic CSI reporting on the PUSCH.

FIG. 4 shows an example of periodic/SPS CSI-RS and aperiodic CSI reporting on the PUSCH. A periodic CSI-RS may be configured (e.g., in periodic/SPS CSI-RS and aperiodic CSI reporting on the PUSCH) by higher layers (e.g., periodic) or activated by a DCI (e.g., SPS). The gNB may send a DCI on the PDCCH with information identifying the resource for the CSI report for transmission on the PUSCH (e.g., as an offset from the DCI). An example of periodic/SPS CSI-RS and aperiodic CSI reporting on the PUSCH is shown in FIG. 4. One or more CSI-ReportConfig(s) may be linked to one or more CSI-RS resource setting(s). The CSI-RS resource may be an L1-RSRP resource (e.g., if the CSI-ReportConfig is linked to one CSI-RS resource setting). A first CSI-RS resource may be an NZP CSI-RS channel resource and a second may be a CSI-IM (e.g., if the CSI-ReportConfig is linked to two CSI-RS resource settings).

The NZP CSI-RS resource for semi-persistent CSI-RS may be active in a duration of time. For example, the NZP CSI-RS resource for semi-persistent CSI-RS may be active starting from the end of when the activation command is applied and ending at the end of when the deactivation command is applied.

The NZP CSI-RS resource for periodic CSI-RS may be active, for example, starting when the periodic CSI-RS is configured by higher layer signaling and ending when the periodic CSI-RS configuration is released. Reports associated with the SPS CSI-RS may be sent based on a PDCCH request for transmission on the PUSCH.

Periodic/SPS CSI-RS and aperiodic CSI reporting on the PUSCH may support Type I and/or Type II CSI feedback. The CSI may be split into two parts (e.g., Part 1 and Part 2), with the bits in Part 1 identifying the bits in Part 2.

Figure 5:
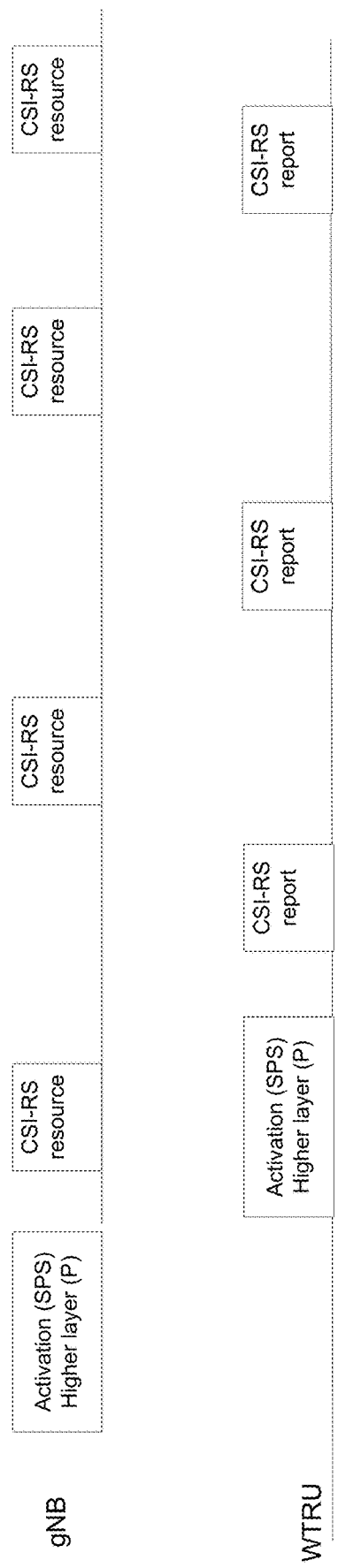
FIG. 5 shows an example of periodic/SPS CSI-RS and periodic/SPS CSI reporting on the PUCCH.

FIG. 5 shows an example of periodic/SPS CSI-RS and periodic/SPS CSI reporting on the PUCCH. In periodic/SPS CSI-RS and periodic/SPS CSI reporting on the PUCCH, a periodic CSI-RS may be configured by higher layers (e.g., periodic) and/or activated by a DCI (e.g., SPS). A periodic CSI report may be configured by higher layers (e.g., periodic) and/or activated by a DCI (e.g., SPS) for transmission on the PUCCH (e.g., see FIG. 5). One or more CSI-ReportConfig(s) may be linked to one or more resource setting(s). The CSI-RS resource may be an L1-RSRP resource (e.g., if the CSI-ReportConfig is linked to one CSI-RS resource setting). A first CSI-RS resource may be an NZP CSI-RS channel resource and a second may be a CSI-IM (e.g., if the CSI-ReportConfig is linked to two CSI-RS resource settings).

The NZP CSI-RS resource may be active in a duration of time. For example, the NZP CSI-RS resource may be active starting from the end of when the activation command is applied and ending at the end of when the deactivation command is applied (e.g., for semi-persistent CSI-RS) For example, the NZP CSI-RS resource may be active starting when the periodic CSI-RS is configured by higher layer signaling and ending when the periodic CSI-RS configuration is released (e.g., for periodic CSI-RS).

Periodic/SPS CSI reporting on the PUCCH may support Type I wideband, Type 1 sub-band, and/or Type II wideband CSI feedback.

Figure 6:
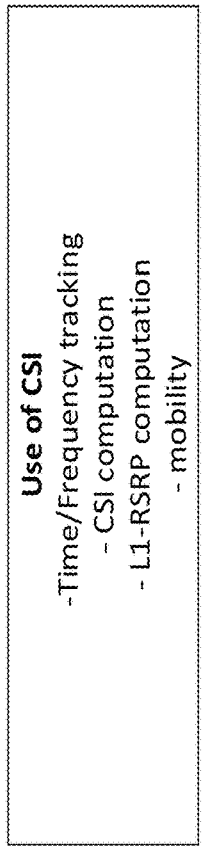
FIG. 6 shows an example of a Previously Presented Radio (NR) CSI.

FIG. 6 shows an example of NR CSI.

Periodic, semi-persistent and aperiodic uplink SRS, downlink CSI-RS, interference measurement, and/or uplink CSI reporting may be disclosed herein (e.g., associated with NR). SRS, CSI-RS, and/or CSI feedback may consider the uncertainty of medium access (e.g., Cat 1, 2, 3, or 4 LBT) in the unlicensed spectrum and/or transmissions subject to LBT. Mechanisms for SRS, CSI-RS, and/or CSI feedback transmission may determine that it may be possible that the medium is busy when the medium is accessed (e.g., when the device performs LBT), for example because the medium is a shared medium.

For aperiodic CSI-RS and aperiodic CSI reporting on the PUSCH, NR may use deterministic transmission of the CSI-RS after the PDCCH containing the request or trigger, with the transmission of the CSI-RS indicated using the aperiodic triggering offset. NR may use deterministic transmission of the PUSCH containing the CSI report associated with the aperiodic CSI-RS using an aperiodic report offset. NR-U may consider the non-deterministic transmission of the DCI, CSI-RS, and/or CSI report due to the possible failure of the LBT before transmission of one or more (e.g., any) of the elements.

For periodic/SPS CSI-RS and aperiodic CSI reporting on the PUSCH, the CSI-RS may be transmitted at fixed periodic intervals for the duration of the configuration (e.g., in periodic CSI-RS) and/or for the duration of the SPS activation (e.g., in SPS CSI-RS). For NR-U, the gNB may not be able to transmit the CSI-RS at the scheduled time (e.g., due to the failure of an LBT before the transmission or the lack of an active COT). A WTRU may fail to transmit the aperiodic CSI report on receipt of a DCI request (e.g., due to failure of the WTRU LBT). The transmission of the CSI-RS and/or CSI report may be non-deterministic (e.g., due to the need for an LBT before channel access). The non-deterministic transmission of the CSI-RS and/or the CSI feedback may be considered.

For periodic/SPS CSI-RS and periodic/SPS CSI reporting on the PUSCH, the CSI-RS may be transmitted at fixed periodic intervals for the duration of the configuration (e.g., in periodic CSI-RS) and/or for the duration of the SPS activation (e.g., in SPS CSI-RS). The CSI report may be transmitted at fixed periodic intervals for the duration of the configuration (e.g., in periodic CSI-RS) and/or for the duration of the SPS activation (e.g., in SPS CSI-RS).

A gNB or WTRU may not be able to transmit the CSI-RS and/or the CSI report at the scheduled time, for example, due to the failure of an LBT before the transmission or the lack of an active COT. The transmission of the CSI-RS and/or the CSI report may be non-deterministic (e.g., due to the need for an LBT before channel access). Non-deterministic transmission of the CSI-RS and/or the CSI feedback may be disclosed herein.

A noLBTtimeLimit may be defined as a time duration for which no LBT is needed by a node (e.g., gNB/WTRU) before transmission. The noLBTtimeLimit may be a time period, for example, 16 usecs.

For aperiodic CSI-RS and aperiodic CSI-Reporting on the PUSCH, there may be no LBT, no LBT for a CSI resource and LBT for a CSI report, LBT for a CSI resource and LBT for a CSI report, and/or multiple DCIs/no LBT for a CSI report.

There may be no LBT before transmission of the CSI-RS resource and the CSI report. For example, LBT may not be performed if an aperiodic triggering offset and an aperiodic report offset are less than noLBTtimeLimit. Transmission of the CSI-RS and the CSI report may be performed as in NR.

LBT may not be performed before a CSI-RS transmission. LBT may be performed by a WTRU before the transmission of a CSI report. For example, there may be LBT before transmission of the CSI report and no LBT before transmission of the CSI-RS if the aperiodic triggering offset is less than or equal to noLBTtimeLimit and the aperiodic Report offset is greater than noLBTtimeLimit.

Figure 7:
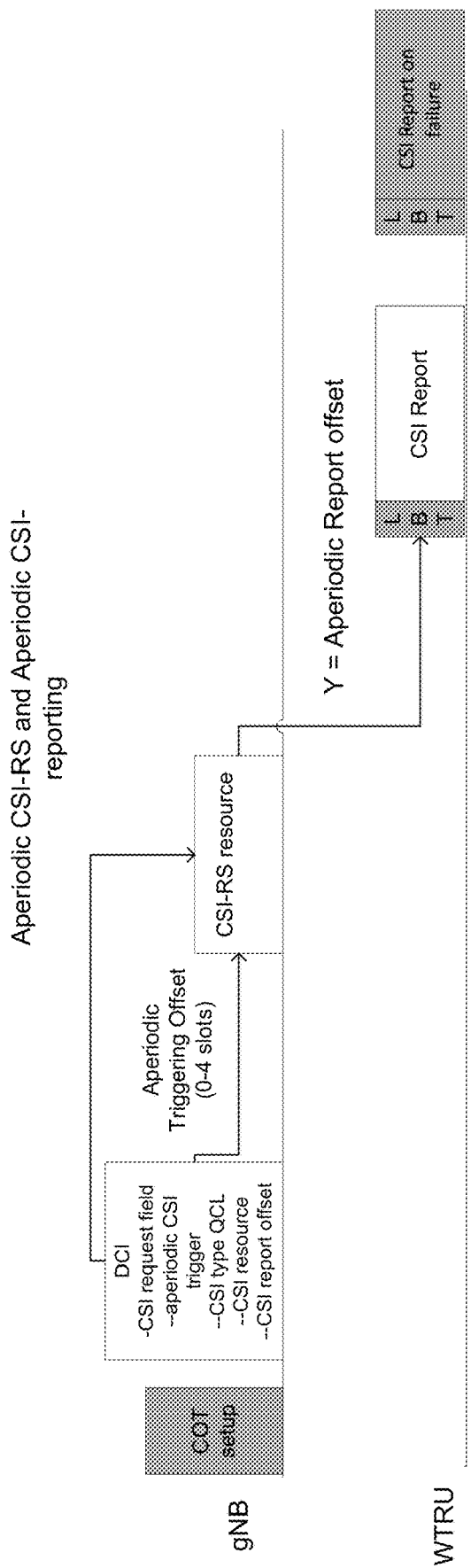
FIG. 7 shows an example of aperiodic CSI reporting (e.g., with LBT).

A gNB may configure one or more opportunities for CSI report transmission, with one or more resources provided in the case of a LBT failure. The resources may be provided in time (e.g., as shown in FIG. 7) or in frequency (e.g., using different frequency bands or Bandwidth Parts (BWPs)). In an example, the DCI may configure multiple resources by sending multiple CSI report offsets to allow for transmission of the CSI report on the additional resources in case of failure (e.g., LBT failure) on the previous resources. The DCI may configure multiple CSI types for the different CSI report resources used. For example, the DCI may configure two CSI report resources (e.g., CSI report resource 1 and CSI report resource 2). The first CSI report resource (e.g., CSI report resource 1) may be configured with an aperiodic report offset 1 and CSI report type 1 (e.g., sub-band CSI feedback). The second CSI report resource (e.g., CSI report resource 2) may be configured with an aperiodic report offset 2 with CSI report type 2 (e.g., wideband CSI feedback). On failure of the WTRU to transmit a first CSI report (e.g., due to LBT failure) the WTRU may attempt to transmit a second CSI report (e.g., as shown in FIG. 7). The first CSI report and the second CSI report may be the same and/or may be derivatives of the same report. For example, in Type II CSI feedback, there may be wideband feedback (W1) and sub-band feedback (W2). Wideband feedback may refer to a first level feedback that may define one or more characteristics over a band (e.g., over the entire band). Sub-band feedback may further refine wideband feedback. The first CSI report and the second CSI report may include W1 and/or W2. For example, the first CSI report may include W1 and W2, while the second CSI report may include W1 (e.g., only W1), for example to account for limited space for the second CSI report.

A gNB may perform LBT before CSI-RS transmission and a WTRU may perform LBT before transmission of a CSI report For example, the gNB and the WTRU may perform LBT if the aperiodic triggering offset and the aperiodic report offset are greater than noLBTtimeLimit.

An aperiodic CSI-RS resource within a CSI-RS resource window may be disclosed herein. A DCI may define one or more CSI-RS resource windows within which a gNB may attempt an LBT before transmission of a CSI-RS (e.g., to account for LBT failure). Configured WTRUs may search for the CSI-RS within the window(s). The resources may be within a slot, across slots, and/or across COTs (e.g., a multi-slot offset, or a single slot/multi-symbol offset). Use of the resources may be based on the success of earlier or more prioritized resources (e.g., in the case of separation of the resources in frequency or BWPs).

In an example, a DCI may define two CSI-RS resource windows, which may be referred to as Window 1 and Window 2. Window 1 may have a duration of X units of time. Window 2 may have a duration of Y units of time. The windows may have an interval of Z units of time/frequency/BWP between them. X and Y may be equal. CSI-RS resources (e.g., each CSI-RS resource) may be linked to the same or different CSI reporting resources (e.g., CSI report resources). The second CSI-RS resource window may be used upon LBT failure in the first CSI-RS resource window. The second CSI-RS resource window may be allocated to a separate time, frequency, and/or bandwidth part. One or more of the elements of the window configuration may be signaled by higher layer signaling combined with the DCI. For example, the window duration and interval between windows may be configured by higher layers, with the start of each window indicated by the DCI. In another example, the DCI may signal the information.

A target WTRU may ignore CSI-RS resources. For example, upon successful reception of a CSI-RS within a CSI-RS resource window, the target WTRU may ignore one or more (e.g., all) subsequent CSI-RS resources. A target WTRU may transmit its CSI report in the CSI report resources linked to the CSI-RS resource window. CSI report resources linked to the ignored CSI-RS resources may be ignored. The resources for the subsequent CSI-RS resources and CSI report resources may be re-used, for example by reallocating them using an override PDCCH.

A target WTRU (e.g., and other WTRUs allocated within any prior PDCCH) may ignore additional PDCCH allocations. An additional PDCCH may re-allocate/re-assign CSI-RS and CSI report resources, and may be addressed to WTRUs that were not assigned in the current COT. The PDCCH may include one or more (e.g., two) parts. For example, the PDCCH may include an indicator transmitted in a group common PDCCH and a resource allocation PDCCH.

The indicator may (e.g., explicitly) indicate that the CSI-RS transmission was successful, and may indicate within what specific resource the indicator was sent (e.g., as opposed to a window). The target WTRU may be able to utilize the information (e.g., when the information is in a buffer). The WTRUs that were not assigned during the COT may be able to identify the CSI-RS success and/or search for the override PDCCH that re-allocates the CSI-RS and CSI report resources.

An additional/override PDCCH may be sent (e.g., by the gNB) after the CSI-RS resources (e.g., to prevent the need for LBT). The additional/override PDCCH may indicate that the WTRU should stop transmitting on further configured CSI resources. The target WTRU (e.g., and other WTRUs) may listen for the additional PDCCH to re-allocate its uplink PUSCH transmission (e.g., the full override case).

Figure 8:
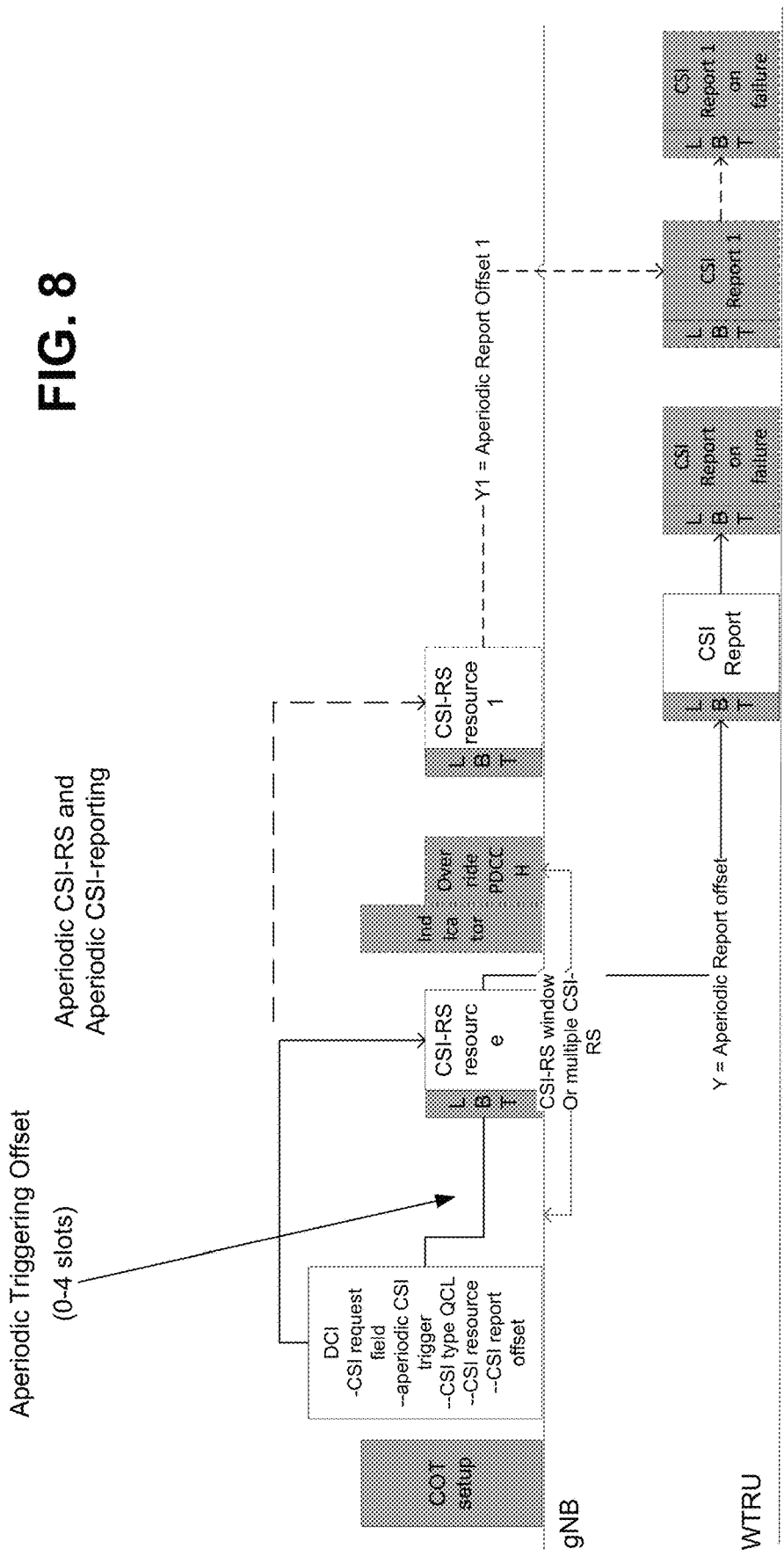
FIG. 8 shows an example of aperiodic CSI-RS resource and aperiodic CSI reporting (e.g., with LBT).

FIG. 8 shows an example of aperiodic CSI-RS resource and aperiodic CSI reporting with LBT.

Aperiodic CSI reporting with repetition on the PUSCH may be performed. A DCI may provide multiple opportunities for CSI report transmission with additional resources provided in the case of LBT failure. The transmission opportunities may be tied to the CSI-RS resource. The resources may be provided in time (e.g., as shown in FIG. 8) or in frequency (e.g., different frequency bands and/or BWPs). The DCI may send multiple CSI report offsets to allow for transmission of the CSI report on failure. The DCI may modify the CSI type based on the CSI resource used For example, a CSI report offset 1 and a CSI report 1 (e.g., suband CSI feedback) may be used, and/or a CSI report offset 2 and a CSI report 2 (e.g., wideband CSI feedback) may be used.

Figure 9:
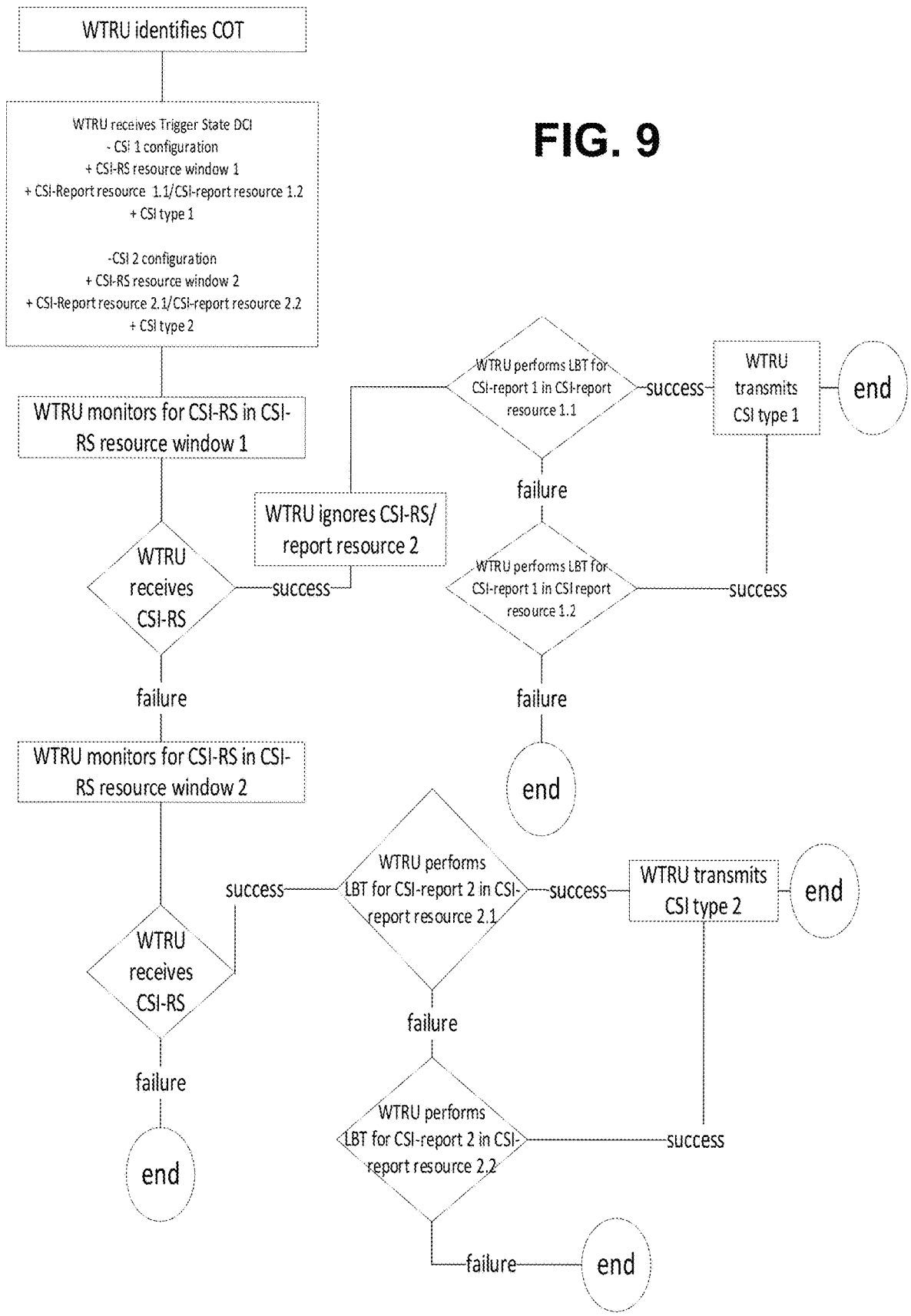
FIG. 9 shows an example of an implementation for a target WTRU.

FIG. 9 is an example of an implementation for a WTRU (e.g., a target WTRU) for aperiodic CSI-RS and aperiodic CSI-Reporting on the PUSCH and LBT for a CSI Resource and LBT for a CSI Report. As shown in FIG. 9, a WTRU (e.g., a target WTRU) may identify the start and duration of a COT. The WTRU may identify one or more CSI-RS resource windows (e.g., on receipt of a DCI). The WTRU may monitor the signal for a CSI-RS (e.g., for the duration of a first CSI resource window). If the CSI-RS is received, the WTRU may identify the CSI report resources for transmission and/or the corresponding CSI reports for each resource. The WTRU may determine an availability of (e.g., perform LBT on) CSI report resource 1 linked to CSI-RS resource 1. If LBT is successful, the WTRU may send the CSI report on CSI resource 1 linked to CSI-RS resource 1. If LBT fails, the WTRU may determine an availability of (e.g., perform LBT on) CSI report resource 2 linked to CSI-RS resource 1. If LBT is successful, the WTRU may send the CSI report on CSI resource 2 linked to CSI-RS resource 1. The WTRU may ignore additional CSI-RS resources and CSI-report resources. If the CSI-RS is not received, the WTRU may monitor the GC-PDCCH for an indicator that identifies if the CSI-RS was successful. If LBT for CSI-resource 1 failed, the target WTRU may monitor the signal for the CSI-RS for the duration of a second CSI resource window 2. If the CSI-RS is received, the WTRU may identify the CSI report resources for transmission and/or the corresponding CSI reports for each resource. The WTRU may determine an availability of (e.g., perform LBT on) CSI report resource 1 linked to CSI-RS resource 2. If LBT is successful, the WTRU may send the CSI report on CSI resource 1 linked to CSI-RS resource 2. If LBT fails, the WTRU may determine an availability of (e.g., perform LBT on) CSI report resource 2 linked to CSI-RS resource 2 linked to CSI-RS resource 2. If LBT is successful the WTRU may send the CSI report on CSI resource 2. If the CSI-RS is not received, the WTRU may determine that the CSI-RS failed.

In an example, a WTRU (e.g., a target WTRU) may identify the start and duration of a COT. The WTRU may receive a transmission from a network (e.g., a gNB). The transmission may be a DCI. The transmission may include information that indicates one or more (e.g., two) CSI-RS resources and one or more (e.g., four) CSI reporting resources (e.g., CSI report resources). For example, the information may indicate CSI-RS resources 1 and 2 and CSI reporting resources 1.1., 1.2, 2.1, and 2.2. A CSI-RS resource (e.g., each CSI-RS resource) may be associated with two CSI reporting resources. For example, CSI-RS resource 1 may be associated with CSI reporting resources 1.1 and 1.2, and CSI-RS resource 2 may be associated with CSI reporting resources 2.1 and 2.2. A CSI reporting resource may be indicated in the transmission as an offset relative to the CSI-RS resource associated with the CSI reporting resource. For example, CSI reporting resources 1.1 and 1.2 may be indicated as offsets relative to CSI-RS resource 1, and CSI reporting resources 2.1 and 2.2 may be indicated as offsets relative to CSI-RS resource 2.

The WTRU may identify one or more (e.g., 2) CSI-RS resource windows based on the transmission. The WTRU may monitor a first CSI-RS resource (e.g., CSI-RS resource 1) for a CSI-RS for the duration of a first CSI resource window (e.g., which may be referred to as CSI-RS resource window 1). If the CSI-RS is received on CSI-RS resource 1, the WTRU may identify the CSI reporting resources associated with CSI-RS resource 1 (e.g., CSI reporting resources 1.1 and 1.2) for transmission and/or the corresponding CSI reports for each resource. The WTRU may determine an availability of CSI reporting resource 1.1 (e.g., by performing LBT associated with CSI reporting resource 1.1). If CSI reporting resource 1.1 is determined to be available (e.g., LBT is successful for CSI reporting resource 1.1), the WTRU may send the CSI report on CSI reporting resource 1.1. If CSI reporting resource 1.1 is determined to be unavailable (e.g., LBT fails for CSI reporting resource 1.1), the WTRU may determine an availability of CSI reporting resource 1.2 (e.g., by performing LBT associated with CSI reporting resource 1.2). If CSI reporting resource 1.2 is determined to be available (e.g., LBT is successful for CSI reporting resource 1.2), the WTRU may send the CSI report on CSI reporting resource 1.2, and the WTRU may ignore subsequent CSI-RS resources and CSI reporting resources. If the CSI-RS is not received on CSI-RS resource 1, the WTRU may monitor the GC-PDCCH for an indicator that identifies if the CSI-RS was successful.

If the WTRU does not receive the CSI-RS on CSI-RS resource 1 (e.g., which may occur if LBT for CSI-RS resource 1 failed at the gNB), the WTRU may monitor a second CSI-RS resource (e.g., CSI-RS resource 2) for the CSI-RS for the duration of a second CSI-RS resource window (e.g., which may be referred to as CSI-RS resource window 2). If the CSI-RS is received on CSI-RS resource 2, the WTRU may identify the CSI reporting resources associated with CSI-RS resource 2 (e.g., CSI reporting resources 2.1 and 2.2) for transmission and/or the corresponding CSI reports for each resource. The WTRU may determine an availability of CSI reporting resource 2.1 (e.g., by performing LBT associated with CSI reporting resource 2.1). If CSI reporting resource 2.1 is determined to be available (e.g., LBT is successful for CSI reporting resource 2.1), the WTRU may send the CSI report on CSI reporting resource 2.1. If CSI reporting resource 2.1 is determined to be unavailable (e.g., LBT fails for CSI reporting resource 2.1), the WTRU may determine an availability of CSI reporting resource 2.2 (e.g., by performing LBT associated with CSI reporting resource 2.2). If CSI reporting resource 2.2 is determined to be available (e.g., LBT is successful for CSI reporting resource 2.2), the WTRU may send the CSI report on CSI reporting resource 2.2. If the CSI-RS is not received on either CSI-RS resource 1 or CSI-RS resource 2, the WTRU may assume that the CSI-RS failed.

FIG. 10 shows an example of an implementation for a non-target WTRU that was not assigned during a COT. The WTRU may identify a COT. The WTRU may receive a DCI. The WTRU may determine that the WTRU is not scheduled in the COT. The WTRU may listen (e.g., continuously) for a CSI-RS indicator in GC-PDCCH that identifies the success or failure of a CSI-RS transmission. If the indicator indicates success, the WTRU may monitor for an override PDCCH (e.g., on a separate channel) for reallocation of CSI-RS and CSI reporting resources. If resources are allocated, the WTRU may transmit in unused resources.

Figure 11:
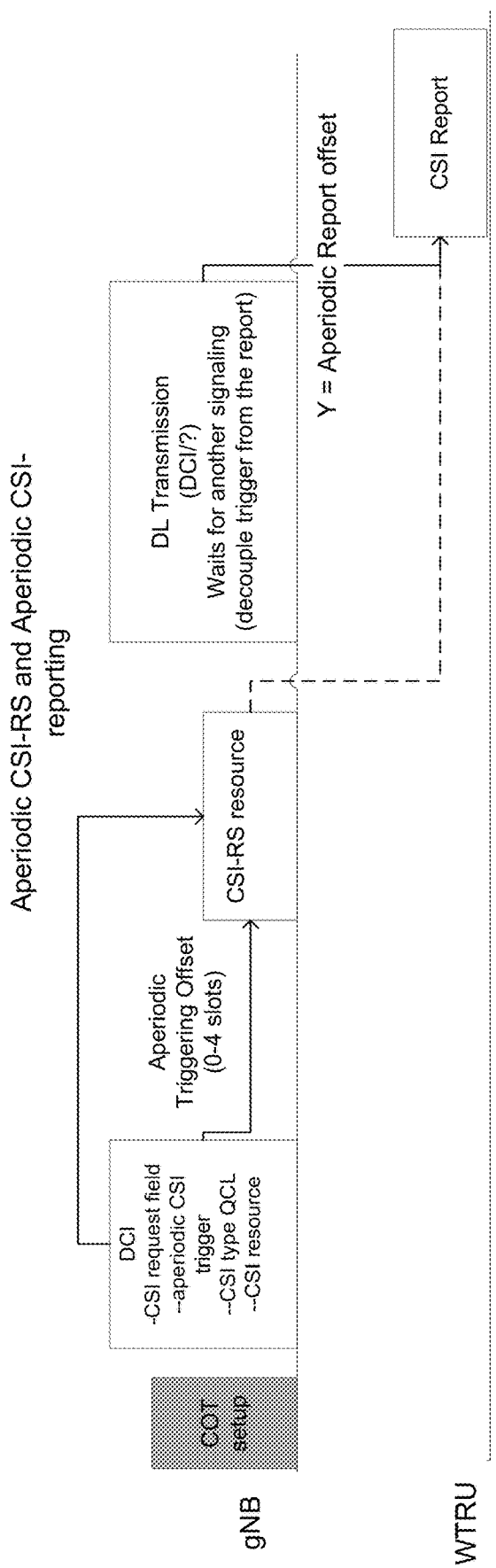
FIG. 11 shows an example of aperiodic CSI-RS and aperiodic CSI reporting on the PUSCH and multiple downlink control informations (DCIs) (e.g., without LBT).

An example of aperiodic CSI-RS and aperiodic CSI reporting on the PUSCH and multiple DCIs for a CSI report (e.g., without LBT) is shown in FIG. 11. As shown in FIG. 11, the gNB may not send a CSI report offset with the DCI after the COT setup. LBT may not be performed after the CSI resource. A second DCI may occur after the transmission. The gNB may transmit during the duration.

LBT may not be performed before transmission of a CSI report. For example, if there is a relatively short duration between when the gNB transmits to the WTRU and when the WTRU transmits to the gNB, the WTRU may not perform LBT (e.g., or the WTRU may perform a relatively short LBT for a fixed duration (e.g., Cat2 LBT)). For example, if the gNB sends a CSI-RS and continues on to send data, the WTRU may (e.g., may need to) send a reply (e.g., immediately) after the data is sent (e.g., even if the data is sent to a different WTRU). The DCI may define one or more CSI-RS resource windows (e.g., to account for LBT failure). For one or more of these windows, the gNB may attempt LBT (e.g., before transmission of the CSI-RS). The attributes of the resources and the implementations that the gNB may use to access one or more of these resources may be as described herein.

The WTRU may prepare and transmit a CSI report (e.g., within 16 µs or less) after the reception of the CSI-RS in the CSI-RS resource. The duration between the CSI-RS resource and transmission of the CSI report (e.g., which may be 16 µs or less) may include one or more (e.g., one or two) OFDM symbols, during which the gNB may not transmit a signal. The number of OFDM symbols may depend on a numerology. If the gap between DL and UL is less than 16 µs, the WTRU may not perform LBT (e.g., Cat 1 LBT). The gap may be larger than 16 µs but less than 25 µs (e.g., depending on the numerology). If the gap is larger than 16 µs but less than 25 µs the WTRU may perform LBT (e.g., a one-shot-LBT or Cat 2 LBT). The offset for the CSI report transmission may be with respect to the end of the CSI-RI. A WTRU may be configured for an offset value (e.g., either of the offset values of 16 µs or 25 µs).

The CSI-resource and the CSI report may be decoupled. A first DCI may indicate that a second DCI may be used. A WTRU may not perform LBT for the CSI report. Processing may disqualify a WTRU for fast transmission of the CSI report (e.g., right after the CSI-RS). In an example, the gNB may send (e.g., continuous) DL transmission and transmit a second PDCCH (e.g., and/or DCI) to the WTRU. The gNB may transmit the second PDCCH after an amount of time that is considered enough for the WTRU to have prepared the CSI report has passed. The amount of time may depend on one or more factors, which may include for example the processing capability of the WTRU and/or the amount of CSI that is being reported. For example, the amount of time may be shorter if the amount of CSI being reported is lower (e.g., the rank of the channel only) and longer if the amount of CSI being reported is higher (e.g., MU-MIMO for Type II MIMO). The second PDCCH/DCI may contain no additional information with respect to the first DCI. The second PDCCH/DCI may trigger a WTRU to transmit a CSI report within a first offset (e.g., 16 µs) after the DCI (e.g., without LBT, as described herein) or to transmit the CSI report within a second offset (e.g., 25 µs) after the DCI (e.g., the WTRU performs one shot LBT as described herein). The offset for CSI report transmission may be with respect to the second DCI. A WTRU may be configured for the first and/or the second offset value (e.g., 16 µs or 25 µs). The gNB may indicate the offset value by indicating to the WTRU that a CSI report is expected within an offset period (e.g., 16 µs or 25 µs).

Performing LBT may cause a WTRU to be unable to send its CSI report (e.g., depending on the density of inter/intra-RAT nodes on the unlicensed channel). The gNB may determine to avoid the second PDCCH/DCI (e.g., if the gNB determines that the density of the inter/intra-RAT nodes in the vicinity is low). The gNB may indicate in a first DCI whether a second DCI will be transmitted, and the WTRU may configure itself based on whether a second DCI is indicated.

An aperiodic report may be used outside of a current COT. A WTRU may determine that for aperiodic CSI-RS, the CSI-RS resource is active. For example, the WTRU may determine that the CSI-RS resource is active in a duration of time starting from the end of the PDCCH containing the request/CSI trigger and ending at the end of the current COT. If the CSI resource for transmitting the associated CSI report falls outside of the current COT time window, the WTRU may follow one or more of the following behaviors. The WTRU may not (e.g., may not be expected to) transmit the associated CSI-RS report. The WTRU may not perform LBT and may wait to receive a DCI with a CSI request field in a subsequent COT for transmitting the associated CSI report. If a WTRU does not receive a new PDCCH/DCI in the subsequent COT for a corresponding CSI report, or if a WTRU receives a PDCCH but the DCI does not include the CSI request field, the WTRU may transmit the associated CSI report in a CSI resource provided by a higher layer. If the WTRU is configured with an uplink grant for PUSCH transmission, the WTRU may multiplex a CSI report with UL data and/or autonomously transmit the CSI report (e.g., or a part of the CSI report) on the configured PUSCH resource.

A semi-persistent CSI-RS may be configured using higher layer signaling and activated using the DCI (e.g., to configure multiple transmission opportunities for an aperiodic CSI-RS). The higher layer signaling may configure the times at which the CSI-RS may be sent (e.g., specific times or within a time window). An SPS signal may be de-activated by a (e.g., new) DCI and/or (e.g., immediately) following a successful transmission of the signal. There may be multiple transmission opportunities with minimal signaling overhead (e.g., by deactivating an SPS signal (e.g., immediately) following a successful signal transmission).

The descriptions provided to transmit the CSI-RS may be used to transmit the downlink shared channel.

Periodic/SPS CSI-RS and aperiodic CSI reporting on the PUSCH may be used with no LBT for a CSI resource and LBT for a CSI Report, and/or LBT for the CSI resource and LBT for the CSI report.

LBT may not be used for a CSI resource and LBT may be used for a CSI report. Deterministic periodic/SPS CSI within a COT may be used. A COT may be set up. CSI-RS resources may be allocated based on the SPS or periodic timing within the duration of the COT. Periodic or SPS CSI-RS resources not within the duration of the COT may be skipped. The gNB may have (e.g., continuous) control of the channel before any CSI-RS resource. LBT may not be used. The transmission resource within the COT may be deterministic.

Figure 12:
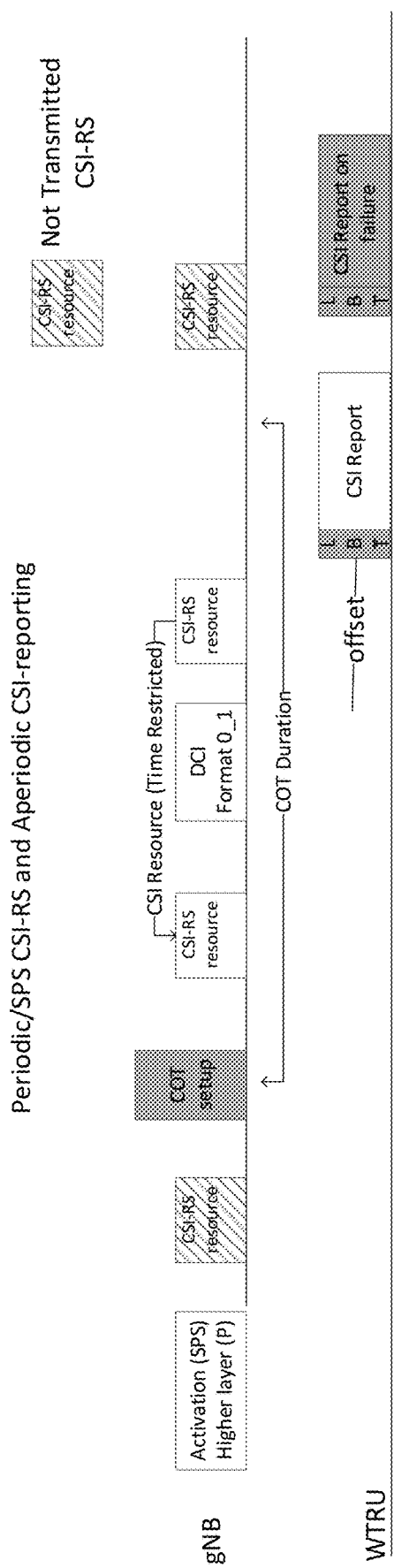
FIG. 12 shows an example of periodic/SPS CSI-RS and aperiodic CSI reporting (e.g., with repetition).

Aperiodic CSI reporting with repetition on the PUSCH may be used. A DCI may be used to schedule a CSI report. LBT may not be used before transmission of the CSI report (e.g., if the Aperiodic Report Offset is less than noLBTtimeLimit). LBT may be used before transmission of the CSI report (e.g., if the aperiodic report offset is greater than noLBTtimeLimit), for example as described herein. FIG. 12 which shows an example of periodic/SPS CSI-RS and aperiodic CSI reporting with repetition.

Figure 13:
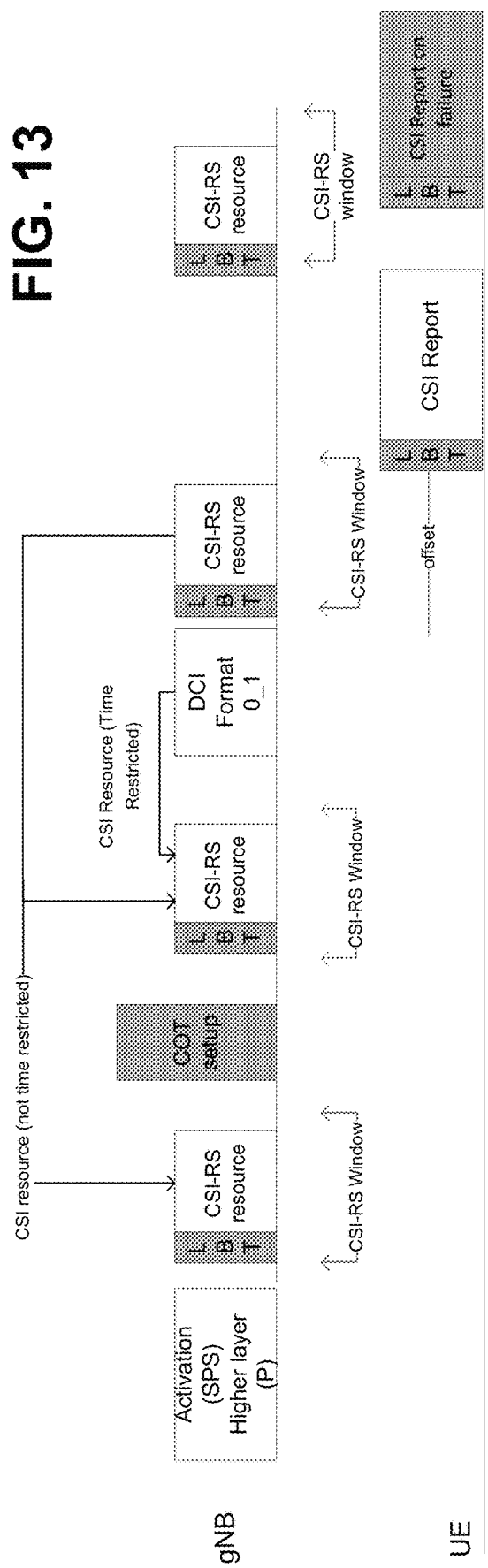
FIG. 13 shows an example of periodic/SPS CSI-RS with a CSI resource window and aperiodic CSI reporting (e.g., with repetition).

LBT may be used for a CSI resource and for a CSI report. FIG. 13 shows an example of periodic/SPS CSI-RS with a CSI resource window and aperiodic CSI reporting with repetition. A periodic/SPS CSI with a CSI-RS resource window may be used. The CSI-RS resource setup (e.g., an activation for SPS or a configuration signaled by higher layer signaling for a periodic case) may allow for variability of the CSI-RS resource within a single COT or across multiple COTs. A gNB may define one or more periodic CSI-RS resource windows. The gNB may perform an LBT and/or may attempt to send the CSI-RS in the periodic CSI-RS resource windows. The WTRU may monitor the CSI-RS for measurement in the periodic CSI-RS resource windows. The parameters (e.g., the CSI-RS window duration) used within a COT may be the same or different from the parameters used outside a COT (e.g., when the gNB acquires a medium using a Cat 4 LBT). The CSI-RS resource may be skipped (e.g., if a COT is not set up). The CSI-RS resource window may be increased. For example, the window may be increased if a COT is not set up (e.g., to account for the gNB acquiring a medium using a Cat 4 LBT). The CSI-RS window may be smaller (e.g., if the COT is set up).

Aperiodic CSI reporting with repetition on the PUSCH may be used. WTRU timing may be asynchronous with CSI resource timing (e.g., with the use of DCI to trigger a CSI report). WTRU timing may be based (e.g., only based) on the DCI reporting offset. The WTRU may feed back information, which may be based on the latest periodic CSI-RS resource (e.g., depending on if the WTRU is time restricted or non-time restricted). The non-time restricted measurement configuration may restrict measurement to multiple CSI measurement windows within a COT and/or allow measurement of multiple CSI measurement windows across multiple COTs.

A gNB may schedule a PUSCH for a CSI report within a period of time (e.g., 16 μs or 25 μs) after one or more CSI-RS resources. The scheduling of PUCCH within this period of time may permit the WTRU to operate without using LBT (e.g., Cat 1 LBT) for transmission of the CSI report, or to use one-shot LBT (e.g., Cat 2 LBT), for example according to regulatory rule(s). The regulatory rules may define, for example, a receive power threshold for LBT (e.g., −60 dBm). The WTRU may not include the effect of the last CSI-RS in the immediate next CSI-Report (e.g., if the time between the last CSI-RS and the transmission time of the CSI report is short). The WTRU may include the effect of the CSI-RS in the CSI report that comes after the next CSI report. For example, if CSI-RS are transmitted on n−k, n−j, n−i, and n slots, where k>j>i, the WTRU may be scheduled to transmit the CSI report on slot n and slot n+k. The WTRU may (e.g., only) include the effect of the CSI-RS in slots n−k, n−j, and n−i in its CSI report transmitted on slot n. For the next CSI report on n+k, the WTRU may include the effect of the CSI-RS in slot n and the effect of the CSI-RS on subsequent slots (e.g., n+i, n+j, etc.).

Using Cat 1 LBT or Cat 2 LBT may provide an increased chance of channel access. The processing power for the preparation of the CSI report in a short time may disqualify some WTRUs. The gNB may transmit a second PDCCH/DCI to trigger a WTRU to send a CSI report within a period of time (e.g., 16 μs or 25 μs) after a second DCI. A WTRU may not perform LBT (e.g., Cat 1 LBT) or may use one-shot LBT (e.g., Cat 2 LBT) for transmission of the CSI report, for example according to regulatory rules. Whether the WTRU uses Cat 1 LBT or Cat 2 LBT may depend on a gap interval (e.g., since the gNB keeps downlink transmission until the gap symbol before the PUCCH).

Figure 14:
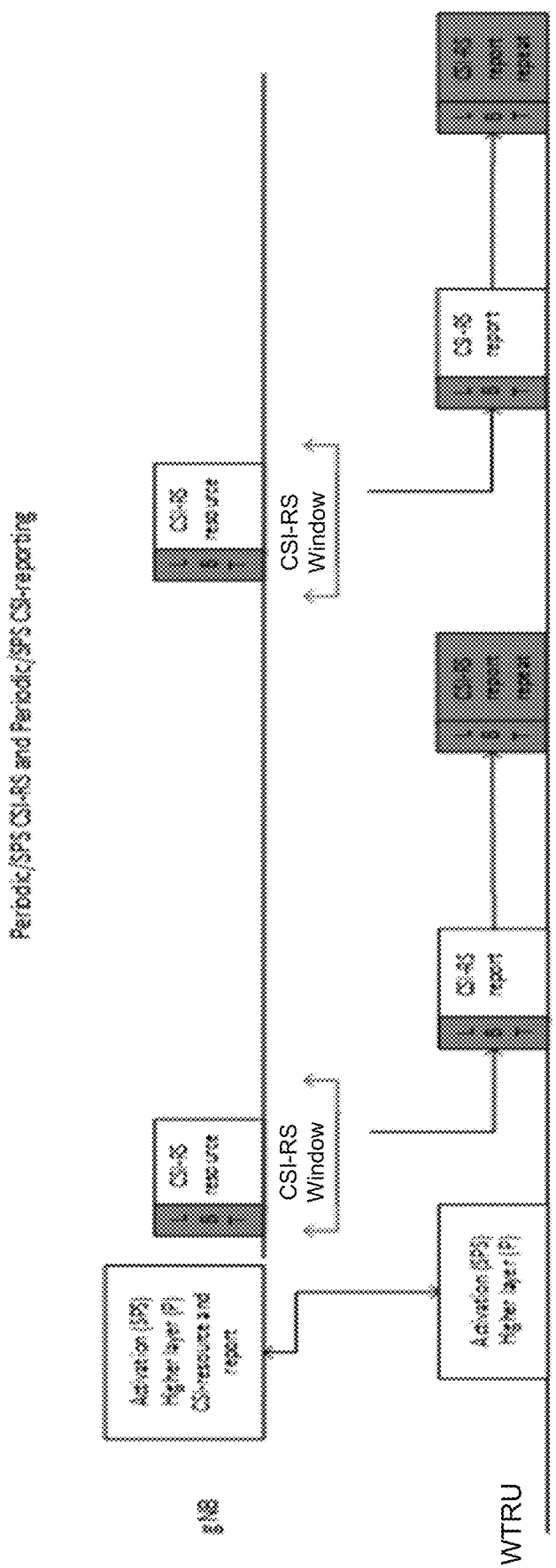
FIG. 14 shows an example of a synchronous CSI report (e.g., with repetition).
Figure 15:
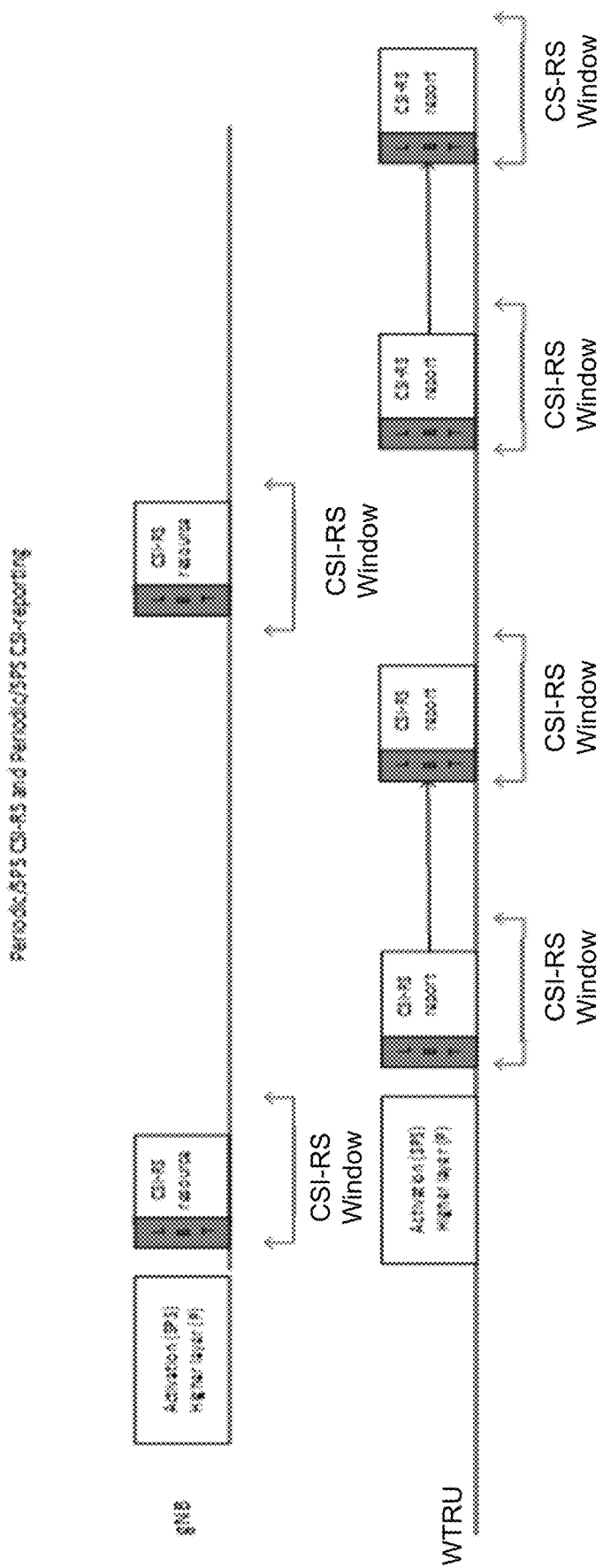
FIG. 15 shows an example of an asynchronous CSI report (e.g., with repetition).

Periodic/SPS CSI-RS and periodic/SPS CSI reporting on the PUCCH may be used. FIG. 14 shows an example of a synchronous CSI report (e.g., with repetition). FIG. 15 shows an example of an asynchronous CSI report (e.g., possible repetition). A periodic/SPS CSI may be transmitted within a CSI-RS window (e.g., as disclosed herein).

Synchronized periodic/SPS CSI reporting on the PUCCH may be used. A WTRU CSI report timing may be synchronized with CSI-RS resource timing (e.g., as illustrated in FIG. 14). The CSI-RS resource activation (e.g., or higher layer configuration) may set the timing of the CSI-RS and CSI report to be the same time, for example as opposed to having separate timing information in the CSI report activation (e.g., or higher layer configuration). There may be a single activation/configuration for both the CSI resource and the CSI report. The WTRU may feedback information based on an actual position of a latest expected CSI. The WTRU may have a fixed offset from the CSI-RS resource. The WTRU may have a repetition resource.

Asynchronous periodic/SPS CSI reporting on the PUCCH may be used. The WTRU CSI-resource timing may be asynchronous with CSI-RS resource timing (e.g., as illustrated in FIG. 15). The CSI-RS resource activation/configuration may be used for resource timing (e.g., only resource timing). The CSI report activation/configuration may be used for CSI report timing (e.g., only CSI report timing). The offset of the CSI report from the CSI resource may vary. In an example, a WTRU may feedback a "channel not changed" indicator. The WTRU may not feedback any information (e.g., if the information has not changed since the last CSI reporting window).

Aperiodic transmission may be performed. For example, aperiodic transmission may include aperiodic transmission of CSI-RS from the gNB to the WTRU (e.g., both ZP and NZP CSI-RS), and may include a timing offset for CSI reporting. The timing offset may be less than or equal to the MOOT plus the duration of feedback for the CSI report from the WTRU to the gNB. The timing offset may be such that the CSI-Report may be sent back in a separate COT (e.g., the timing offset may not be less than or equal to the MOOT plus the duration of feedback). Aperiodic transmission of the SRS from the WTRU to the gNB may be performed.

Approximate periodic signal transmission may be used. The CSI-RS, CSI reporting, interference measurement, and sounding reference signal may be used in NR-U.

The start of the CSI-RS, CSI reporting and/or SRS may be transmitted within periodic windows. The timing within the windows may be set (e.g., partially set) by higher layer signaling and/or activated/deactivated by a DCI. The signals may be transmitted at any time within the window. The window size may be sized for uncertainty due to LBT before transmission.

There may be transmission of a (e.g., one) type of signal (e.g., the CSI-RS, CSI reporting or SRS) within a periodic transmission window (e.g., to accommodate the variability of transmission due to LBT that may not allow for perfectly periodic transmission). The CSI-RS may be decoupled from the LAA DRS (e.g., including the synchronization signals, PBCH, and/or a CSI-RS). Decoupling the CSI-RS from the LAA DRS may provide for more flexible periodicity of the CSI-RS to specific WTRUs.

Independent CSI-RS, CSI reporting, and SRS for multiple WTRUs may be grouped together. For example, the independent CSI-RS, CSI reporting, and SRS for multiple WTRUs may be grouped together to minimize the need for multiple LBTs (e.g., as opposed to allowing for independent CSI-RS transmissions to each user). The gNB may align (e.g., synchronize) the CSI-RS transmissions for WTRUs (e.g., all the WTRUs in the NR-U network (beam)). The gNB may align the CSI-RS transmissions to reduce the amount of CSI-RS channel accesses needed (e.g., compared to situations where the CSI-RS is WTRU specific with WTRU specific periodicity and). The CSI-RS transmissions may be WTRU specific. The CSI-RS periodicity and timing may be synchronized. Precoded CSI-RSs may be used. A single CSI-RS may be used for a group of WTRUs (e.g., where pecoded CSI-RSs are not used). Grouping may provide a form of periodic/semi-persistent feedback with reduced DCI overhead (e.g., for CSI reporting and SRS).

Using approximate aperiodic signal transmissions may reduce overhead, for example compared with aperiodic implementations. Overhead may be reduced by using a single triggering mechanism (e.g., the DCI) to trigger the grouped (e.g., periodic/semi-persistent) signal requests. The relative position of the signal-resource to the triggering DCI may be indicated. The DCI may not be used (e.g., if there is no SS as in the LAA DRS for the WTRU to identify when the signal arrives). The WTRU may search for a triggering DCI. The gNB may use a Group Common DCI to indicate a triggering of a specific signal. The gNB may use a DCI addressed to the group of WTRUs with periodic/semi-persistent signal transmission to trigger the signal.

For periodic and semi-persistent signal transmission (e.g., CSI-RS, CSI reporting, or SRS), the signal (e.g., CSI-RS, CSI report, or SRS) may be transmitted periodically with a periodic timing offset of, for example, +/−x, and a periodicity of y. A signal window duration may be 2x. The timing offset may be +/−x/2, with a signal window duration of x.

The CSI-RS window may be independent of the CSI reporting window. The CSI reporting window may be at a fixed timing offset from the CSI-RS window. CSI reporting may be independent for each WTRU with timing offsets that are WTRU-specific. CSI reporting may be set such that the timing offset+feedback duration is less than the MCOT. The SRS window may be independent of other (e.g., all other) windows.

If the gNB/WTRU is unable to transmit within the duration of the window, the periodic/aperiodic signal may be skipped. If z instances of the signal are skipped, the gNB may indicate a change in the periodicity of the signal and/or a fallback to aperiodic transmission (e.g., only).

The LBT type used may depend on the time of transmission relative to an MCOT. The transmission of the signal may be subject (e.g., if within an MCOT) to Category 2 LBT (e.g., gNB/WTRU listens for a fixed duration without back-off). The transmission of the signal may be subject to a Category 4 LBT (e.g., gNB/WTRU listens and performs back-off), for example if the signal is not transmitted with any data or an MOOT is initiated to enable its transmission.

A next transmission after the CSI-RS may be sent at higher priority. For example, the next transmission after a CSI-RS transmission may be sent at a higher priority if the CSI-RS transmission is missed due to LBT failure. The WTRU may send a flag indicating the loss of an expected periodic transmission (e.g., in a periodic/aperiodic scenario). A transmission loss may be indicated for one or more transmission losses (e.g., each transmission loss). A transmission loss may be indicated (e.g., only) after a preconfigured number of CSI-RSs are missing.

One or more of the following may be configured for a (e.g., each) CSI-RS resource (e.g., ZP or NZP CSI-RS), CSI reporting resource, and/or SRS resource by higher layer parameters (e.g., or by DCI). The periodicity of the resource window may be configured. The periodicity may be relative to the network timing. The gNB may signal a change in the periodicity of the window. The resource window duration relative to the window periodic timing may be configured. The window may have a constant duration over the periodic or semi-persistent transmission, or may change over the periodic of semi-persistent transmission. The window duration may be communicated to the WTRUs by RRC signaling or by DCI. The resource parameters may be configured. A resource (e.g., each resource) may be configured with time/frequency and/or resource parameters (e.g., code) relative to the triggering mechanism. On receiving the triggering mechanism, the WTRU may know when and what it should receive (e.g., in the case of CSI-RS) or transmit (e.g., in the case of CSI reporting or SRS). The triggering mechanism parameters may be configured. The gNB may send the triggering mechanism parameters using a group common PDCCH that indicates the start of the periodic/semi-persistent CSI-RS transmission. A WTRU configured in this mode may read the group common PDCCH and commence CSI-RS processing based on the configured CSI-RS (e.g., and CSI reporting) parameters. The gNB may assign one or more (e.g., all) WTRUs configured for periodic/semi-persistent CSI-RS/CSI reporting (e.g., in NR-U) to a specific ID and may send a DCI based on the group ID.

For periodic or semi-persistent CSI-reporting, an additional timing offset from the approximately periodic CSI-RS may be used.

Figure 16:
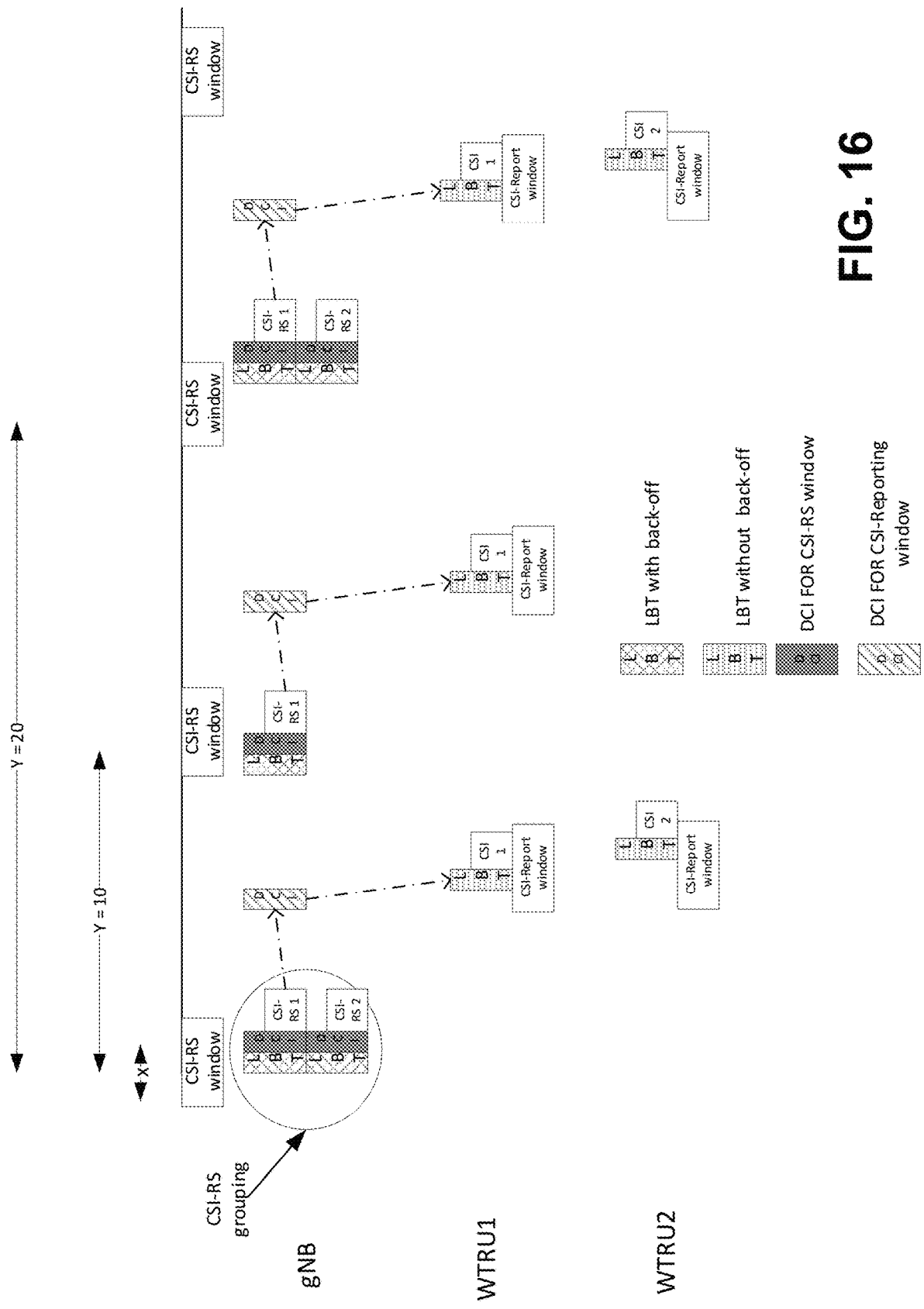
FIG. 16 shows an example of approximately periodic CSI-RS and CSI-RS reporting.

FIG. 16 shows an example of approximately periodic CSI-RS and CSI-RS reporting (e.g., in NR-U). FIG. 16 illustrates an example of frame exchange between a gNB and 2 WTRUs with a common CSI-RS window and different periodicities using a common trigger (e.g., DCI) across both WTRUs for the CSI-RS and a common trigger (e.g., DCI) across both WTRUs for the CSI report.

There may be multiple periodic windows for different groups of WTRUs (e.g., as opposed to one periodic window for all WTRUs).

Figure 17:
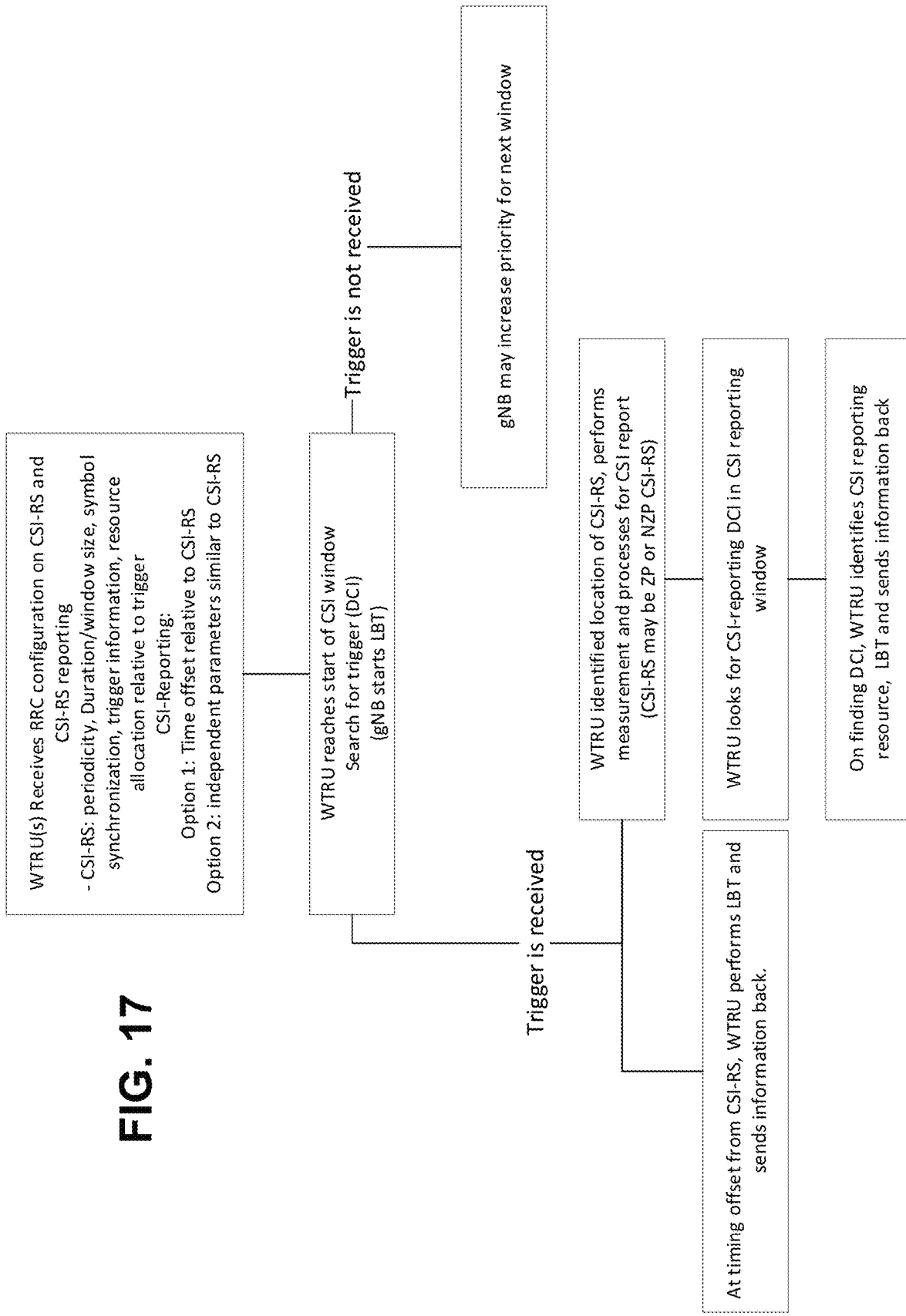
FIG. 17 illustrates a WTRU implementation that may be used for CSI-RS and CSI reporting.
Figure 18:
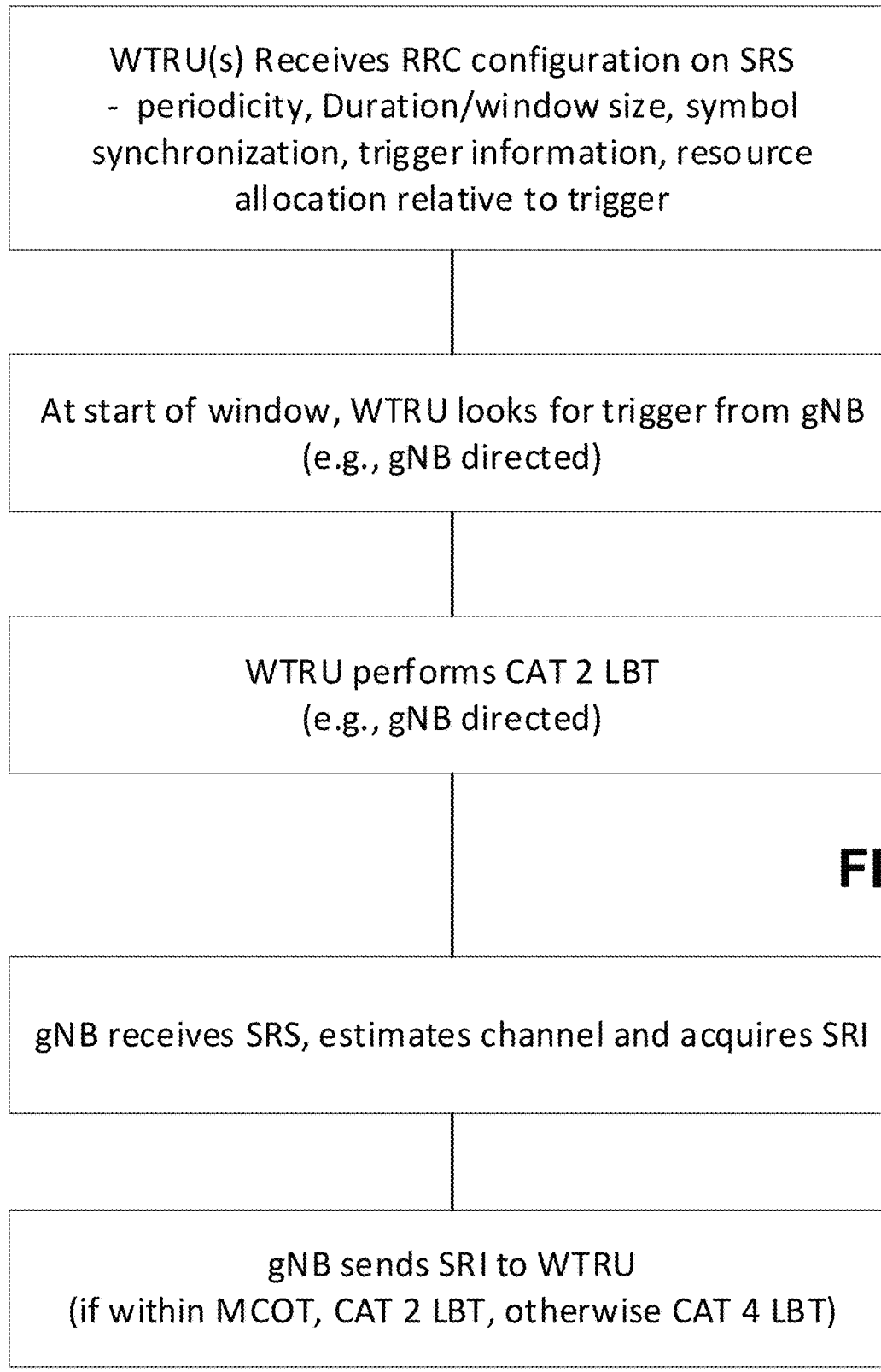
FIG. 18 illustrates a WTRU implementation that may be used for a sounding reference signal (SRS).

FIG. 17 illustrates a WTRU implementation that may be used for CSI-RS and CSI reporting. FIG. 18 illustrates a WTRU implementation that may be used for SRS.

Each of the computing systems described herein may have one or more computer processors having memory that are configured with executable instructions or hardware for accomplishing the functions described herein including determining the parameters described herein and sending and receiving messages between entities (e.g., WTRU and network) to accomplish the described functions.

The processes described above may be implemented in a computer program, software, and/or firmware incorporated in a computer-readable medium for execution by a computer and/or processor. Examples of computer-readable media include, but are not limited to, electronic signals (transmitted over wired and/or wireless connections) and/or computer-readable storage media. Examples of computer-readable storage media include, but are not limited to, a read only memory (ROM), a random access memory (RAM), a register, cache memory, semiconductor memory devices, magnetic media such as, but not limited to, internal hard disks and removable disks, magneto-optical media, and/or optical media such as CD-ROM disks, and/or digital versatile disks (DVDs). A processor in association with software may be used to implement a radio frequency transceiver for use in a WTRU, terminal, base station, gNB, RNC, and/or any host computer.

Although the features and elements are described in particular combinations, each feature or element can be used alone without the other features and elements or in various combinations with or without other features and elements.

Although Previously Presented Radio (NR), 5G or LTE, LTE-A specific protocols have been referenced herein, it is understood that the solutions described herein are not restricted to this scenario and are applicable to other wireless systems as well.

What is claimed is:

1. A wireless transmit/receive unit (WTRU) comprising:
   a processor configured to:
   receive, from a network, a transmission comprising information, wherein the information indicates first and second channel state information reference signal (CSI-RS) resources and first, second, third, and fourth channel state information (CSI) reporting resources, and wherein the first and second CSI reporting resources are associated with the first CSI-RS resource and the third and fourth CSI reporting resources are associated with the second CSI-RS resource;
   monitor the first CSI-RS resource for a CSI-RS;
   on a condition that no CSI-RS is identified in the first CSI-RS resource, monitor the second CSI-RS resource for the CSI-RS;
   receive the CSI-RS on the first CSI-RS resource or the second CSI-RS resource, wherein:
     on a condition that the CSI-RS is received on the first CSI-RS resource, the processor is configured to:
       determine an availability of the first CSI reporting resource,
       on a condition that the first CSI reporting resource is determined to be unavailable, determine an availability of the second CSI reporting resource, and
       on a condition that the second CSI reporting resource is determined to be available, transmit a CSI report on the second CSI reporting resource, and
     on a condition that the CSI-RS is received on the second CSI-RS resource, the processor is configured to:
       determine an availability of the third CSI reporting resource,
       on a condition that the third CSI reporting resource is determined to be unavailable, determine an availability of the fourth CSI reporting resource, and
       on a condition that the fourth CSI reporting resource is determined to be available, transmit the CSI report on the fourth CSI reporting resource.

2. The WTRU of claim 1, wherein the first and second CSI reporting resources are indicated in the transmission as first and second offsets relative to the first CSI-RS resource, and wherein the third and fourth CSI reporting resources are indicated in the transmission as third and fourth offsets relative to the second CSI-RS resource.

3. The WTRU of claim 1, wherein the processor is configured to determine the availability of a CSI reporting resource by performing listen before talk (LBT) associated with the CSI reporting resource.

4. The WTRU of claim 1, wherein the transmission comprises a downlink control information (DCI).

5. The WTRU of claim 1, wherein on a condition that the first CSI resource is determined to be available, the processor is further configured to transmit the CSI report on the first CSI reporting resource.

6. The WTRU of claim 1, wherein on a condition that the third CSI resource is determined to be available, the processor is further configured to transmit the CSI report on the third CSI reporting resource.

7. A method implemented in a WTRU, the method comprising:
   receiving, from a network, a transmission comprising information, wherein the information indicates first and second channel state information reference signal (CSI-RS) resources and first, second, third, and fourth channel state information (CSI) reporting resources, and wherein the first and second CSI reporting resources are associated with the first CSI-RS resource and the third and fourth CSI reporting resources are associated with the second CSI-RS resource;
   monitoring the first CSI-RS resource for a CSI-RS;

on a condition that no CSI-RS is identified in the first CSI-RS resource, monitoring the second CSI-RS resource for the CSI-RS;

receiving the CSI-RS on the first CSI-RS resource or the second CSI-RS resource, wherein:

on a condition that the CSI-RS is received on the first CSI-RS resource, the method further comprises:

determining an availability of the first CSI reporting resource, on a condition that the first CSI reporting resource is determined to be unavailable, determining an availability of the second CSI reporting resource, and on a condition that the second CSI reporting resource is determined to be available, transmitting a CSI report on the second CSI reporting resource, and on a condition that the CSI-RS is received on the second CSI-RS resource, the method further comprises:

determining an availability of the third CSI reporting resource, on a condition that the third CSI reporting resource is determined to be unavailable, determining an availability of the fourth CSI reporting resource, and on a condition that the fourth CSI reporting resource is determined to be available, transmitting the CSI report on the fourth CSI reporting resource.

8. The method of claim 7, wherein the first and second CSI reporting resources are indicated in the transmission as first and second offsets relative to the first CSI-RS resource, and wherein the third and fourth CSI reporting resources are indicated in the transmission as third and fourth offsets relative to the second CSI-RS resource.

9. The method of claim 7, wherein determining the availability of a CSI reporting resource comprises performing listen before talk (LBT) associated with the CSI reporting resource.

10. The method of claim 7, wherein the transmission comprises a downlink control information (DCI).

11. The method of claim 7, wherein on a condition that the first CSI resource is determined to be available, the method further comprises transmitting the CSI report on the first CSI reporting resource.

12. The method of claim 7, wherein on a condition that the third CSI resource is determined to be available, the method further comprises transmitting the CSI report on the third CSI reporting resource.

* * * * *